United States Patent
Keret et al.

(10) Patent No.: US 12,236,438 B2
(45) Date of Patent: Feb. 25, 2025

(54) SYSTEM AND METHOD FOR REAL-TIME FRAUD DETECTION IN VOICE BIOMETRIC SYSTEMS USING PHONEMES IN FRAUDSTER VOICE PRINTS

(71) Applicant: NICE Ltd., Ra'anana (IL)

(72) Inventors: Matan Keret, Oulu (FI); Roman Frenkel, Ashdod (IL); Zvika Horev, Ra'anana (IL)

(73) Assignee: Nice Ltd., Ra'anana (IL)

( * ) Notice: Subject to any disclaimer, the term of this patent is extended or adjusted under 35 U.S.C. 154(b) by 382 days.

(21) Appl. No.: 17/568,408

(22) Filed: Jan. 4, 2022

(65) Prior Publication Data
US 2023/0214850 A1   Jul. 6, 2023

(51) Int. Cl.
| | |
|---|---|
| *G06Q 30/018* | (2023.01) |
| *G06F 16/65* | (2019.01) |
| *G10L 15/02* | (2006.01) |
| *G10L 17/06* | (2013.01) |

(52) U.S. Cl.
CPC ........ *G06Q 30/0185* (2013.01); *G06F 16/65* (2019.01); *G10L 15/02* (2013.01); *G10L 17/06* (2013.01); *G10L 2015/025* (2013.01)

(58) Field of Classification Search
CPC ..... G06Q 30/0185; G06F 16/65; G10L 15/02; G10L 17/06; G10L 2015/025; G10L 17/02; G10L 17/14; G10L 17/26
USPC ....................................................... 704/246
See application file for complete search history.

(56) References Cited

U.S. PATENT DOCUMENTS

| | | |
|---|---|---|
| 8,056,128 B1 | 11/2011 | Dingle et al. |
| 8,145,562 B2 | 3/2012 | Wasserblat et al. |
| 8,225,413 B1 | 7/2012 | De et al. |
| 9,042,867 B2 | 5/2015 | Gomar |
| 9,620,123 B2 | 4/2017 | Faians et al. |
| 9,917,833 B2 | 3/2018 | Gomar |
| 10,110,738 B1 | 10/2018 | Sawant et al. |
| 10,678,899 B2 | 6/2020 | Keret et al. |
| 10,854,204 B2 | 12/2020 | Faians et al. |
| 10,911,600 B1 | 2/2021 | Frenkel et al. |
| 11,039,012 B2 | 6/2021 | Michaeli et al. |
| 11,108,910 B2 | 8/2021 | Frenkel et al. |

(Continued)

OTHER PUBLICATIONS

Glembeck, Ondrej, Lukáš Burget, and Pavel Matejka. "Voice Biometry Standard, Draft." *Brno: Speech@ FIT* (2015).

(Continued)

*Primary Examiner* — Paras D Shah
*Assistant Examiner* — Fouzia Hye Solaiman
(74) *Attorney, Agent, or Firm* — PEARL COHEN ZEDEK LATZER BARATZ LLP

(57) ABSTRACT

A system and method for real-time fraud detection with a social engineering phoneme (SEP) watchlist of phoneme sequences may perform real-time fraud prevention operations including receiving incoming call interactions and grouping the call interactions into one or more clusters, each cluster associated with a speaker's voice based on voiceprints. For a pair of voiceprints in a cluster, a phoneme sequence is extracted for each voice print. From the extracted phoneme sequences, a similarity score is then calculated to determine if a match exists between the extracted phoneme sequences based on a threshold. If determined a match exists, the phoneme sequence may be added to a SEP watchlist.

14 Claims, 9 Drawing Sheets

(56) References Cited

U.S. PATENT DOCUMENTS

| | | |
|---|---|---|
| 2004/0249650 A1 | 10/2004 | Freedman et al. |
| 2011/0206198 A1 | 8/2011 | Freedman et al. |
| 2013/0216029 A1 | 8/2013 | Pawlewski |
| 2015/0055763 A1 | 2/2015 | Guerra et al. |
| 2015/0142446 A1 | 5/2015 | Gopinnathan et al. |
| 2015/0269941 A1 | 9/2015 | Jones |
| 2015/0281446 A1 | 10/2015 | Milstein et al. |
| 2016/0142534 A1 | 5/2016 | Guerra et al. |
| 2018/0032755 A1 | 2/2018 | Odinak |
| 2018/0082689 A1 | 3/2018 | Khoury et al. |
| 2018/0152446 A1 | 5/2018 | Gomar |
| 2019/0037081 A1 | 1/2019 | Rao et al. |
| 2019/0373105 A1 | 12/2019 | Kung et al. |
| 2020/0184979 A1 | 6/2020 | Keret et al. |
| 2020/0250290 A1* | 8/2020 | Keret ................. G06F 21/32 |
| 2021/0037136 A1* | 2/2021 | Michaeli .............. G10L 15/22 |
| 2021/0112163 A1 | 4/2021 | Frenkel et al. |
| 2022/0092274 A1* | 3/2022 | Arivazhagan .......... G06F 40/47 |
| 2023/0082094 A1* | 3/2023 | Keret ................. G10L 17/04 |
| | | 726/2 |
| 2023/0117535 A1* | 4/2023 | Apsingekar .......... G10L 15/063 |
| | | 704/232 |
| 2023/0329630 A1* | 10/2023 | Patel .................. A61B 5/08 |

OTHER PUBLICATIONS

Kleiweg, Peter, http://www.let.rug.nl/~kleiweg/lev/, "Levenshtein Demo", printed Jan. 4, 2022.

* cited by examiner

| Phoneme | insertion | Oh | Ray | Ga | no |
|---|---|---|---|---|---|
| deletion | 0 (II) | 1 (I) | 2 | 3 | 4 |
| Orah | 1 (III) | 1 (IV) | 2 (II) | 3 (I) | 4 |
| ga | 2 | 2 | 2 (III) | 2 (IV) | 3 |
| no | 3 | 3 | 3 | 3 | 2 |

FIG. 9

SYSTEM AND METHOD FOR REAL-TIME FRAUD DETECTION IN VOICE BIOMETRIC SYSTEMS USING PHONEMES IN FRAUDSTER VOICE PRINTS

FIELD OF THE INVENTION

The present invention relates to biometric analysis and voice print during fraud detection, and more specifically to a system and method for real-time fraud detection using similar phonemes detected in two or more fraudster voice prints.

BACKGROUND

When customers interact with different computing systems of a service provider, such as sales or purchasing systems, customer relationship management (CRM) systems, service or help systems, information systems, and the like, the customers may engage in voice communications, require voice authentication, and request sensitive information. These customers may correspond to individual users and/or users of an organization that may want to gain access to certain services and/or data, for example, computing service the users have enrolled in and/or purchased, data the user has stored or generated, and/or previous activity the user has performed with the service provider's systems. The service provider may want to monitor users' audio and corresponding voice prints, in real-time or near real-time, to detect fraudsters and prevent abuse and other malicious conduct.

Biometric authentication and fraud analysis may provide more trusted authentication and fraud detection by performing authentication that should be particular to a specific user and difficult to imitate. Voice biometric systems may also provide fraud detection by monitoring users' voice communications and voice prints to determine if the users match past detected fraudster voice prints that committed computing attacks or abuse. During voice communications, such as communications over a publicly switched telephone network (PSTN), cellular network, voice over IP (VoIP), voice over LTE (VoLTE), and/or voice communications over data networks, voice biometric authentication and fraud detection may be done using voice samples from audio and voice generated from those voice samples. When fraudsters are detected with voice biometric systems, a recording of audio from a user, such as a phrase, name, identifier, voice sample during speech, or the like, may be stored in a database system of the service provider.

Often fraudsters may call a service provider, call center, and/or voice chat service to try to obtain customer information for customers of the service provider. Agents are usually customer-oriented and therefore may mistakenly provide this sensitive information when attempting to provide aid and customer care. This is known as "social engineering" and is an ever increasing method of fraud attacks. Fraudsters may also employ bots to mimic a customer speaking, allowing fraudsters to engage in mass fraud attacks. This information then allows fraudsters to perform account takeovers, steal identities, transfer money/items, and perform additional malicious acts.

Fraudsters often repeat the same phrases across different targets, especially when social engineering is applied, and a bot normally may repeat the same text sequence. In order to reduce and/or eliminate malicious actions by fraudsters during voice communication sessions, voice biometric authentication and fraud detection systems may be used. Conventionally, the voice biometric systems suffer from issues in real-time fraud detection during voice communications. Service providers may utilize offline processes to detect fraudulent activity during calls; however, this does not assist live agents in real-time fraud detection during ongoing calls. Text-independent fraud detection that uses text-independent voice prints of fraudsters may be used, which may utilize watchlists having multiple fraudster voice prints. However, these watchlists have performance issues during scalability and may suffer from accuracy when performing voice biometrics. Thus, the text-independent voice biometric systems for real-time fraud detection may be limited in their accuracy and effectiveness, as well as have additional performance issues caused by large voice print watchlists and/or high system processing loads.

It therefore is desirable to retain the benefits of fraud detection using voice biometric analysis, while minimizing fraud, processing times, and latency issues that may prevent real time fraud detection.

SUMMARY

Embodiments may provide systems and methods for fraud prevention. Such embodiments may improve on prior art systems by performing fraud prevention using a novel phoneme pattern comparison. In conventional voice biometric systems, a voice print may be used to perform voice print comparison and matching, typically using words of voice prints to identify a fraudster. Such embodiments suffer from accuracy and effectiveness as words are not perceptually distinct between individuals. Phonemes, however, are perceptually distinct sounds specific to an individual.

Embodiments disclosed herein may perform proactive fraudster exposure in a customer service center having multiple service channels. Embodiments may include receiving incoming call interactions and storing the interactions to an interactions database. Stored call interactions may be grouped into voice print clusters, each cluster associated with a speaker's voice based on a voice print. For a pair of voice prints in a voice print cluster, each voice print of the pair of voice prints may be extracted for a first and second phoneme sequence. The extracted phoneme sequences may then be used to calculate for a similarity score. It may be determined if a match exists between the first extracted phoneme sequence and the second extracted phoneme sequence based on a threshold. If a match exists, the matched phoneme sequence may then be added to a watchlist.

A system and method for performing real-time fraud prevention may include receiving a real-time call interaction and filtering a predetermined period of the real-time call interaction to generate a buffered audio signal. The buffered audio signal may be extracted for a phoneme sequence. The extracted phoneme sequence may be used to calculate a similarity score between a matched phoneme representation obtained from a social engineering phoneme (SEP) watchlist and said extracted phoneme sequence. If the calculated similarity score is above a threshold, an alert may be triggered.

Embodiments of the invention may include calculating a Levenshtein distance as a similarity score. The Levenshtein distance may be calculated using extracted phoneme sequences. Embodiments of the invention may vectorize a first and second extracted phoneme sequence to compare the first and second phoneme sequences in an indexed i×j matrix. Each i×j element of the matrix may include a distance, wherein the distance is the cost to modify a first subset of a first vector to a second subset of a second vector. The distance values may be calculated by comparing the distance values for three locations, (i, j−1), (i−1, j), and (i−1, j−1) of the i×j matrix. Embodiments of the invention determine a phoneme level Levenshtein distance based on vectors of extracted phoneme sequences.

Embodiments of the invention may include a matched phoneme sequence social engineering phoneme (SEP) watchlist to be used by a real-time fraud prevention system for real-time fraud prevention.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

FIG. 9 is an example Levenshtein distance calculation between two example phoneme sequences according to some embodiments of the present invention.

Figure 1:
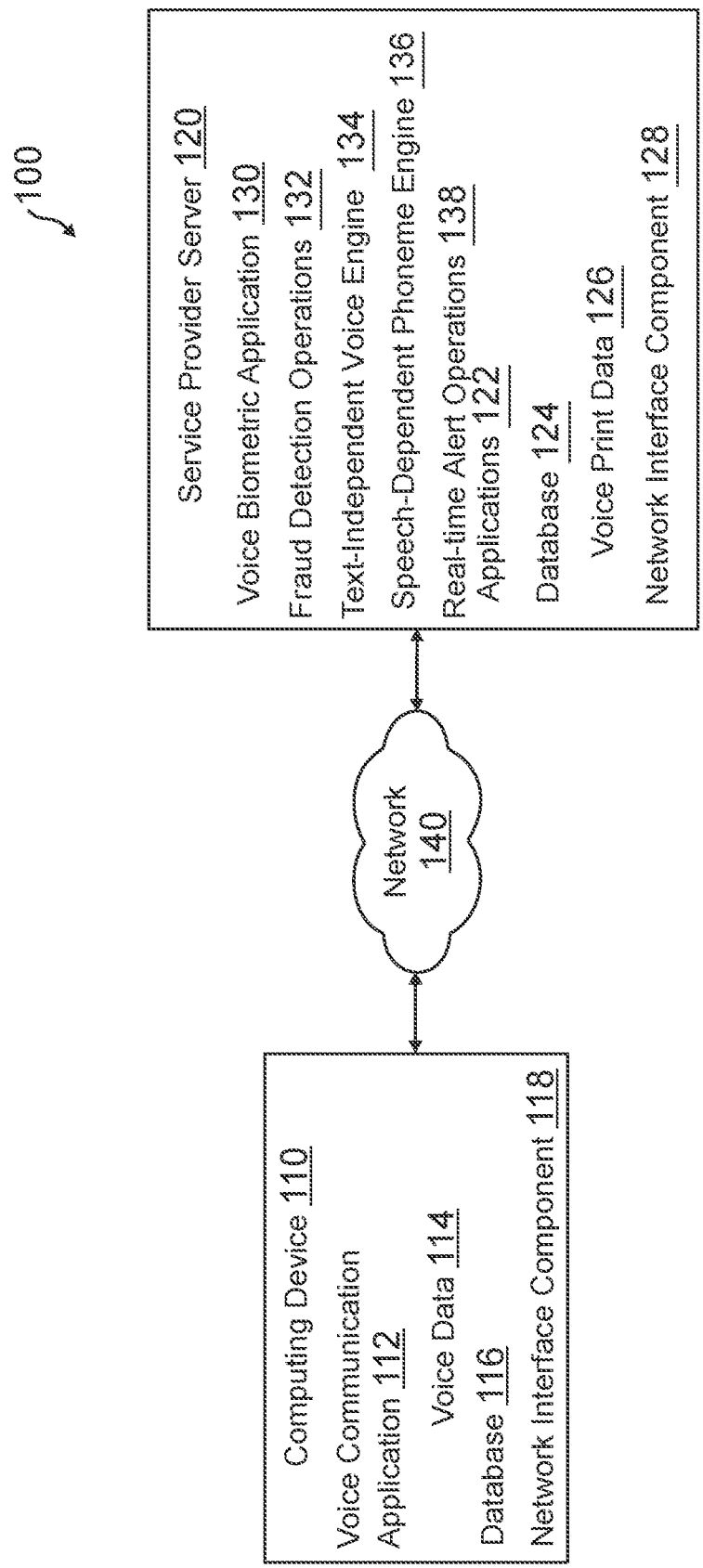
FIG. 1 is a simplified block diagram of a networked environment suitable for implementing the processes described herein according to an embodiment of the present invention.

It will be appreciated that for simplicity and clarity of illustration, elements shown in the figures have not necessarily been drawn accurately or to scale. For example, the dimensions of some of the elements may be exaggerated relative to other elements for clarity, or several physical components may be included in one functional block or element. Further, where considered appropriate, reference numerals may be repeated among the figures to indicate corresponding or analogous elements.

DETAILED DESCRIPTION

In the following detailed description, numerous specific details are set forth in order to provide a thorough understanding of the invention. However, it will be understood by those skilled in the art that embodiments of the present invention may be practiced without these specific details. In other instances, well-known methods, procedures, and components, modules, units and/or circuits have not been described in detail so as not to obscure the invention. Some features or elements described with respect to one embodiment may be combined with features or elements described with respect to other embodiments. For the sake of clarity, discussion of same or similar features or elements may not be repeated.

Although embodiments of the invention are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory storage medium that may store instructions to perform operations and/or processes. Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. Unless explicitly stated, the embodiments of the method described herein are not constrained to a particular order or sequence. Additionally, some of the described embodiments of the method or elements thereof may occur or be performed simultaneously, at the same point in time, or concurrently.

Embodiments may use phoneme sequences and voice prints in voice biometrics, applied to a fraud detection system, such as a system for real-time fraud prevention (RTFP) for biometric analysis and/or authentication using phoneme sequences. A service provider, such as a sale and purchasing system, help or assistance system, CRM system, customer service system, business management system, organizational management system, or other networked service provider, may provide audio and/or audiovisual communications. Audiovisual communications or calls may include telephone calls, video conferencing, audio/video streaming, communication services, and the like. For example, different internal and/or external users of a service provider may interact over end-to-end voice communications, such as when engaging with and calling a customer service and/or CRM system. During voice communications, a voice biometric system may provide biometric authentication and fraud prevention through analysis of voice prints and/or phoneme sequences. This may include comparison of one or more stored voice prints and/or phoneme sequences of one or more fraudsters to a voice print and/or phoneme sequence determined and/or generated during the voice communications.

In conventional systems, voice biometric systems using fraudster voice prints may perform text-independent voice comparison and matching. Text-independent voice print comparison may suffer from accuracy and effectiveness issues as the analysis depends on similarity of vectors and does not consider the words and phonemes used in the underlying voice communications and audio signals. Additionally, text-independent voice biometric systems may not include a process to confirm, at a high rate of accuracy, that a fraudster is present during an ongoing suspicious call. Further, with many voiceprints in a fraudster watchlist, many different comparisons may be required by the voice biometric system. This may not be optimized (or optimizable) in high load systems, and real-time performance for such fraud detection tends to become degraded and slowed. For example, on larger call sets, text-independent voice biometric systems that provide RTFP may result in a substantial number of false positives and a high percentage recall rate.

Embodiments of the present invention using a voice biometric system that provides speech-dependent phoneme sequence comparison and matching for RTFP may reduce false positives and operate more efficiently.

In order to provide text-independent voice biometrics for real-time fraud detection and prevention, a service provider may implement a voice biometric system that takes incoming calls or other voice communications and identifies them as "high risk" or otherwise potentially fraudulent. This may be done using a high risk filter, such as based on pre-defined criteria, business data, authentication failures, designation by one or more agents, and the like, and combinations of each of the foregoing. Text-independent voice biometric matching may then be used to cluster calls, audio data files, and/or voice prints into clusters that have the same or similar voice (e.g. based on sound, tone, volume, language, speech, etc.) each voiceprint associated with a speaker's voice based on the generated voice prints.

Thereafter, a phoneme extraction engine may be used to search for two or more putative fraudster audio data files or voiceprints (e.g., data files for audio signals from the calls or other voice communications) for the same or similar fraudster that repeats a phoneme sequence and/or states a phoneme sequence a certain way that matches to a degree of similarity. These phoneme sequences may correspond to repeated acoustic sequencies that indicate that the same or similar speech patterns were repeated by one or more fraudsters having the same or similar voice. These matched phonemes may be scored using phonetic patterns comparison, specifically using a calculated similarity score.

Once repetitive portions of audio signals within the data files for the calls or other voice communications are identified (e.g. by text-independent voice biometrics), the identified audio signals may be converted to phoneme sequences or patterns. When a new incoming audio or audiovisual call is received, the audio signal from the call may be processed (e.g., by processing the digital signals of the audio) so that a phoneme sequence may be determined. Phoneme sequences may be compared: e.g. the phoneme sequence may correspond to a vector or other mathematical representation that allows for comparison to other vectors or mathematical representations from known fraudsters' phoneme sequences (e.g., generated from audio of fraudsters). Various entities discussed herein, such as phoneme sequences, voice prints, audio recordings, etc. may be represented as vectors, e.g. an ordered list of numbers each including a number of dimensions or features, for the purpose of comparing entities of the same type. For example, different phoneme sequences may be vectorized, and the corresponding vectors, each mathematically representing the associated data, compared to determine the similarity of the phoneme sequences. Vectors may be created, e.g. by neural networks, e.g. as embeddings, via known processes.

Phoneme sequences from audio data files may be used for fraudster social engineering phoneme (SEP) watchlists in phoneme sequence comparison for RTFP in speech-dependent phoneme comparison systems. However, the audio from the putative fraudster data files have repetitive phoneme sequences may be saved and used in a fraudster SEP watchlist, as described herein, to increase the accuracy and efficiency of such systems.

Thereafter, a phoneme pattern comparison system performing RTFP using phoneme sequences may utilize this watchlist during new incoming calls and other voice communications. The phoneme pattern comparison system may compare an extracted phoneme sequence from a new incoming call (e.g. converted from incoming audio signals) to existing fraudster SEP watchlists. Comparison of phoneme sequences may be done through the phoneme pattern comparison system of the service provider that performs audio conversion to phoneme sequences and phoneme sequence comparison through vector analysis. When comparing vectors, a similarity score and/or similarity threshold score may be used to determine if a phoneme sequence from incoming audio sufficiently compares with and/or matches one of more fraudster phoneme sequences. For example, a highest similarity score may be used and/or a 90% similarity score threshold (or other pre-selected score threshold based on percent similarity) may be required when matching phoneme sequences to fraudster phoneme sequences. Thus, in some embodiments a highest scored comparison between phoneme sequences (and their corresponding vectors) may be used to identify potential fraudsters; however, a threshold may further be required to avoid false positives when a highest scored match may only be, for example, 25% and thus unlikely to be similar. It should be understood that, as processing technology, equipment, and other changes increase accuracy and efficiency, the thresholds for matching may be adjusted when desired.

In one embodiment, to generate the phoneme sequence from the incoming call audio, the audio signals may be sent to a buffer periodically, e.g. every X seconds. The buffered audio signal may be converted to a phoneme sequence and the phoneme sequence extracted for comparison. Thereafter, the a system using voice biometrics augmented by phoneme analysis may utilize a phoneme pattern comparison engine to perform matching of the incoming phoneme sequence(s) and the fraudster phoneme sequences in the SEP watchlist. A sliding window (e.g. sampling a sequential set of data of a fixed size, where the "window" of fixed size is moved a certain distance of data or time, periodically, to form a new sample) of the incoming phoneme sequence and the fraudster phoneme sequence may also be used to facilitate phoneme sequence comparison at different times during the incoming call. If a match is found, an alert may be triggered and may be sent to an agent or a supervisor/manager (e.g., via a web or application event, application programming interface (API) call, or using an already initiated API). However, if no matches are found, the incoming call may be further monitored based on additional buffered audio and generated phoneme sequences.

Embodiments described herein provide methods, computer program products, and computer database systems for fraudster phoneme pattern comparison systems in real-time fraud detection. The service provider system associated with or incorporating a fraudster phoneme pattern comparison system may therefore, process, encode, and compare phoneme sequences during voice communications, thereby providing robust RTFP during voice communications. For example, an online system may provide a biometric authentication and fraud detection system that provides voice fraud detection and phoneme comparison in real-time and/or with reduced latency, thereby resulting in faster and more accurate fraud detection and notification.

According to some embodiments, in a service provider computing system accessible by a plurality of separate and distinct organizations, a fraudster phoneme pattern comparison system is provided for identifying and designating particular phoneme sequences as fraudsters based on repetitive fraudster phonemes in audio data files. The generated phoneme sequences may be used for voice biometrics in RTFP, thereby optimizing voice biometrics in fraud detection, reducing data processing resource and costs, and providing faster voice biometric processing with better accuracy.

Embodiments may include, incorporate, or operate in conjunction with or in the environment of a voice biometric service, system, database, and portal, which may include web and device applications used for voice biometric processing for fraudster authentication and/or fraud detection and prevention services during voice communications. FIG. 1 is a block diagram of a networked environment suitable for implementing the processes described herein according to an embodiment. However, embodiments of the invention may operate with other equipment and environments. In FIG. 1, an environment 100 may include devices, servers, and/or software components performing embodiments of the present invention. Exemplary devices and servers may include device, stand-alone, and enterprise class servers, operating an operating system (OS) such as a MICROSOFT® OS, a UNIX® OS, a LINUX® OS, or another suitable device and/or server-based OS. It can be appreciated that the devices and/or servers illustrated in FIG. 1 may be deployed in other ways and that the operations performed, and/or the services provided, by such devices and/or servers may be combined or separated for a given embodiment and may be performed by a greater number or fewer number of devices and/or servers. For example, cloud-based architectures have been developed to improve collaboration, integration, and community-based cooperation between users without sacrificing data security. One or more devices and/or servers may be operated and/or maintained by the same or different entities.

FIG. 1 illustrates a block diagram of an example environment 100 according to some embodiments. Environment 100 may include computing device 110 and a service provider server 120 that interact to provide automated comparison of phoneme sequences during voice communications for voice biometric authentication and fraud detection. In other embodiments, environment 100 may not have all of the components listed and/or may have other elements instead of, or in addition to, those listed above. In some embodiments, the environment 100 is an environment in which a phoneme pattern comparison system is provided for RTFP using phoneme sequences. A computing device 110 may be any machine or system that is used by a user to perform voice communications and/or provide audio analyzed during real-time fraud detection using voice biometrics. Computing device 110 can be a handheld computing device, a mobile phone, a laptop computer, a notepad computer, a workstation, and/or a network of computing devices. As illustrated in FIG. 1, computing device 110 may interact via a network 140 with service provider server 120, which performs the voice biometrics.

Computing device 110 may be utilized to access computing services, resources, and/or data via voice communication application 112. Computing device 110 may be utilized by a customer, client, or another user that interacts with service provider server 120 for voice communications. A user's unique identification (ID) may be provided during a login or authentication process performed via computing device 110 with service provider server 120, which may require audio signals converted to a phoneme sequence for voice authentication that may be analyzed for fraud using fraudster phoneme sequences. The user may further provide additional audio signals during a voice communication with service provider server 120 and/or an agent's device for an agent associated with service provider server 120, which may be used to further convert to and generate phoneme sequences of the user that are compared to the fraudster phoneme sequences in a SEP watchlist.

Computing device 110 may access computing resources provided by service provider server 120 and therefore fraud detection may be required to prevent or minimize malicious users and entities from fraudulently using such resources, as well as accessing sensitive or secure data. The user may provide audio signals via voice communication application 112 in the form of voice data 114 that is convertible to phoneme sequences. Thus, computing device 110 may correspond to a device, server, or the like that interfaces with service provider server 120 to utilize the services, applications, data storage, and the like of the corresponding computing environment. Service provider server 120 may receive the unique ID for the customer and provide access to computing resources via applications 122, which may include applications provided by a CRM system using voice communications. In some embodiments, voice communication application 112 or other software applications residing locally on computing device 110 may access, display, output, and/or utilize applications 122 provided by service provider server 120.

Service provider server 120 may be utilized by different customers, clients, organizations, companies, and/or other users to access and utilize computing resources, which may provide voice biometrics for authentication and fraud detection. Service provider server 120 may provide computing services via applications 122 and may utilize a voice biometric application 130 to provide voice authentication and fraud detection through voice biometrics. Applications 122 may include applications utilized by users, which provide services, data processing, storage, and the like to user via computing device 110, such as those involved in sale and purchasing, help or assistance services, call centers for customer business and/or inquiries, CRM, business management, organizational management, and the like. Voice biometric application 130 may include fraud detection operations 132 to perform voice biometric authentication and operations for RTFP. In order to perform fraud detection operations 132, a text-independent voice engine 134 and a speech-dependent phoneme engine 136 may be utilized. If fraud is detected during ongoing calls using analyzed phoneme sequences from the calls and stored in fraudster SEP watchlists, real-time alert operations 138 may be executed to provide real-time alerts to agents during the ongoing calls.

Service provider server 120 may provide services for voice authentication and fraud detection through voice biometric application 130, which may include voice biometrics for authentication and RTFP using phoneme pattern comparison. For example, voice data 114 may be provided by computing device 110 during voice communications. Voice biometric application 130 may utilize fraud detection operations 132 during voice communications to compare an incoming phoneme sequence from voice data 114 to one or more fraudster phoneme sequences in fraudster SEP watchlists. Text-independent voice engine 134 may utilize a text-independent fraudster voice print watchlist for RTFP during voice communications. Speech-dependent phoneme engine 136 may utilize a fraudster phoneme SEP watchlist for RTFP during voice communications, which may be generated as discussed herein. Thus, phoneme pattern comparison engine 136 may provide real-time alerts for real-time fraud detection during ongoing voice communications.

Voice data 114 from voice communication application 112 on computing device 110 may be used when logging in to an account or other authentication system for access and use of computing services provided through applications 122. Voice data 114 may also be provided during voice communications, which may not require a prior authentication or may occur after the authentication. For example, voice data 114 may be provided during voice communications to access data, request transaction processing and other services, and otherwise engage in computing services via applications 122. Voice biometric application 130 may execute fraud detection operations 132 having text-independent voice engine 134 and phoneme pattern comparison engine 136 to detect potential fraud when comparing incoming phoneme sequences in real-time to fraudster phoneme sequences. Voice biometric application 130 may therefore allow service provider server 120 to perform voice biometric authentication and/or fraud detection of the user using computing device 110. The text-independent and fraudster voice print watchlists and the fraudster SEP watchlists used by text-independent voice engine 134 and phoneme engine 136, respectively, may correspond to stored, vectorized, encoded, and/or compressed voice prints and/or phoneme sequences for voice biometric analysis and comparison. Thereafter, voice biometric application 130 may provide an authentication and/or fraud detection result to computing device 110 and/or an agent device monitoring and/or engaging in voice communications. Results and alerts may be provided by real-time alert operations 138, which may include alerts to approve or decline authentication, indicate potential fraud or a potentially fraudulent user in voice communications, and/or otherwise engage in an action to minimize or avoid fraud, account takeover, and other malicious actions. A watchlist may be a list of entities, people, etc., suspected of fraud or other malicious behavior, such that entities contacting an organization are compared against the watchlist to aid in fraud detection.

In some embodiments, the users of computing device(s) 110 may differ in their respective capacities, and the capacity of a particular computing device 110 might be determined by applications, permissions, and profiles for the current user. Thus, different users will have different capabilities and perform different authentication events with regard to accessing and authenticating via voice communication application 112. This is not mandatory, however, and it is understood that computing device 110 may generally have certain capacities that are universal to users, entities, or other clients (thereby not specific to operations submitted for processing by service provider server 120). Access and permission to use certain capacities may be modified at various times, and current user profiles may be updated, e.g., upon promotion into a new role that permits or requires different types of access.

Computing device 110 may execute a web-based client that accesses a web-based application for service provider server 120, or may utilize a rich client, such as a dedicated resident application, to access service provider server 120. Computing device 110 may utilize one or more application programming interfaces (APIs) to access and interface with service provider server 120 to engage in voice communications. Thus, voice communication application 112 can be used to access data and applications hosted by service provider server 120 and to perform searches on stored data, for example, through providing an audio and/or audiovisual interface to a user (e.g., a GUI output) or via an API of voice communication application 112. Interfacing with service provider server 120 may be provided through voice communication application 112 and may include data stored to a database 116, such as a device fingerprint, device ID, or other ID that may be provided during voice communications. Service provider server 120 may process and provide data through applications 122. Database 124 of service provider server 120 may store phoneme sequence data 126 associated with fraudster phoneme sequences and/or fraudster SEP watchlists, such as encoded and/or compressed phoneme sequences for voice biometrics. Computing device 110 may communicate with service provider server 120 using TCP/IP and, at a higher network level, use other common Internet protocols to communicate, such as hypertext transfer protocol (HTTP or HTTPS for secure versions of HTTP), file transfer protocol (FTP), wireless application protocol (WAP), etc. Communication between computing device 110 and service provider server 120 may occur over network 140 using a network interface component 118 of computing device 110 and a network interface component 128 of service provider server 120. In an example where HTTP/HTTPS is used, computing device 110 might include an HTTP/HTTPS client commonly referred to as a "browser" for sending and receiving HTTP//HTTPS messages to and from an HTTP//HTTPS server, such as service provider server 120 via network interface component 118. Similarly, service provider server 120 may host an online platform accessible over network 140 that communicates information to and receives information from computing device 110 via network interface component 128. Such an HTTP/HTTPS server might be implemented as the sole network interface between computing device 110 and service provider server 120, but other techniques might be used as well or instead. In some implementations, the interface between computing device 110 and service provider server 120 includes load sharing functionality. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

Computing device 110 may utilize network 140 to communicate with service provider server 120, which is any network or combination of networks of devices that communicate with one another. For example, the network can be any one or any combination of a local area network (LAN), wide area network (WAN), telephone network, wireless network, point-to-point network, star network, token ring network, hub network, or other appropriate configuration. As the most common type of computer network in current use is a transfer control protocol and Internet protocol (TCP/IP) network, such as the global inter network of networks often referred to as the Internet. However, it should be understood that the networks that the present embodiments might use are not so limited, although TCP/IP is a frequently implemented protocol.

According to one embodiment, service provider server 120 is configured to provide webpages, forms, applications, data, and media content to computing device 110 and/or to receive data from computing device 110. In some embodiments, service provider server 120 may be provided or implemented in a server environment and/or cloud environment, which may be accessible through one or more APIs with or without a corresponding graphical user interface (GUI) output. Service provider server 120 further provides security mechanisms to keep data secure. Additionally, the term "server" is meant to include a computer system, including processing hardware and process space(s), and an associated storage system and database application (e.g., object-oriented data base management system (OODBMS) or relational database management system (RDBMS)). It should also be understood that "server system" and "server" are often used interchangeably herein. Similarly, the database objects described herein can be implemented as single databases, a distributed database, a collection of distributed databases, a database with redundant online or offline backups or other redundancies, etc., and might include a distributed database or storage network and associated processing intelligence.

Device 110 may include a desktop personal computer, workstation, laptop, notepad computer, PDA, cell phone, or any wireless access protocol (WAP) enabled device or any other computing device capable of interfacing directly or indirectly to the Internet or other network connection. Computing device 110 may also be a server or other online processing entity that provides functionalities and processing to other client devices or programs, such as online processing entities that provide services to a plurality of disparate clients.

Computing device 110 typically executes an HTTP/HTTPS client, e.g., a browsing program, such as Microsoft Internet Explorer® or Edge® browser, Google Chrome® browser, Mozilla Firefox® browser, or a WAP-enabled browser in the case of a cell phone, notepad computer, PDA or other wireless device, or the like. According to one embodiment, computing device 110 and all of its components are configurable using applications, such as a browser, including computer code run using a central processing unit such as an Intel Pentium® processor or the like. However, computing device 110 may instead correspond to a server configured to communicate with one or more client programs or devices, similar to a server corresponding to service provider server 120 that provides one or more APIs for interaction with computing device 110.

Thus, computing device 110 and/or service provider server 120 and all of their components might be operator-configurable using application(s) including computer code to run using a central processing unit, which may include an Intel Pentium® processor or the like, and/or multiple processor units. A server for computing device 110 and/or service provider server 120 may correspond to Window®, Linux®, and the like operating system server that provides resources accessible from the server and may communicate with one or more separate user or client devices over a network. Exemplary types of servers may provide resources and handling for business applications and the like. In some embodiments, the server may also correspond to a cloud computing architecture where resources are spread over a large group of real and/or virtual systems. A computer program product embodiment includes a machine readable storage medium (media) having instructions stored thereon/in which when executed cause a computer processor to perform methods described herein, e.g., utilizing one or more computing devices or servers.

Computer code for operating and configuring computing device 110 and/or service provider server 120 to intercommunicate and to process webpages, applications and other data and media content as described herein are preferably downloaded and stored on a hard disk, but the entire program code, or portions thereof, may also be stored in any other volatile or nonvolatile memory medium or device corresponding to database 116 and/or database 124, such as a read only memory (ROM) or random-access memory (RAM), or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory integrated circuits (ICs)), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, virtual private network (VPN), LAN, etc.) using any communication medium and protocols (e.g., TCP/IP, HTTP, HTTPS, Ethernet, etc.) as are well known. It will also be appreciated that computer code for implementing embodiments of the present disclosure can be implemented in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun MicroSystems, Inc.).

Figure 2:
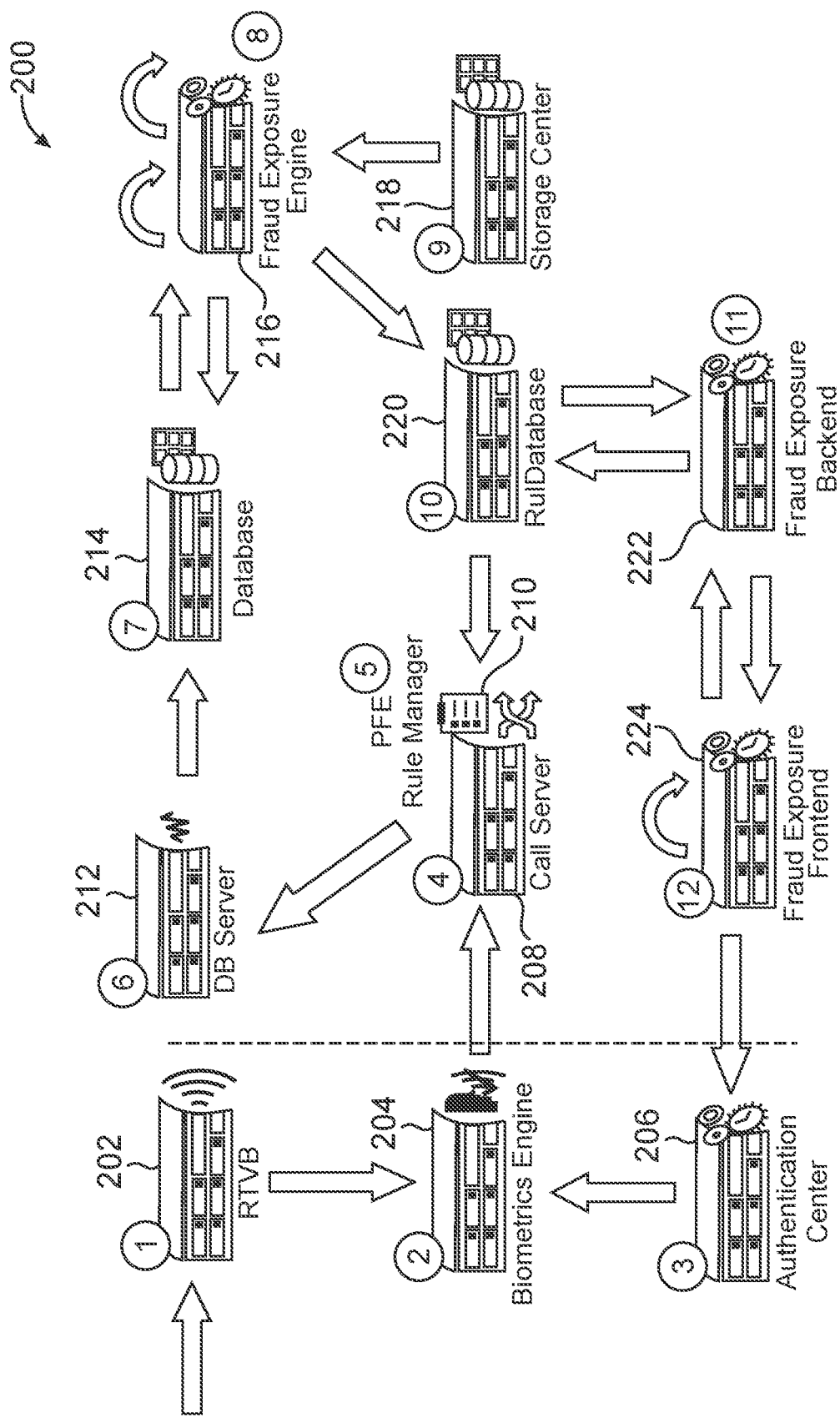
FIG. 2 depicts a simplified diagram of exemplary interactions with a service provider's systems that generate and implement phoneme social engineering phoneme (SEP) and text-independent voice print watchlists for voice biometric fraud prevention according to some embodiments of the present invention.

FIG. 2 is a simplified diagram of exemplary interactions with a service provider's systems (e.g. service provider 120 of FIG. 1) that generate and implement fraudster SEP watchlists for phoneme sequences in voice biometric fraud prevention according to some embodiments. Diagram 200 of FIG. 2 includes operations performed by the components of a service provider's systems and servers when receiving an incoming call or other voice communications, such as voice communication exchanges, API calls, and data retrieval. In this regard, diagram 200 displays a RTFP flow between the components of the service provider's system when generating fraudster phoneme sequences and corresponding watchlists, and thereafter implementing in a real-time voice biometric system.

In diagram 200, initially a customer or other end user may contact an agent through a service provider or other audio or audiovisual communication channel with the service provider (e.g., a CRM platform and communication channel). At or prior to an interaction 1, the incoming call may reach the service provider and a new communication session and interactions may start with the service provider's system. The contact channel may communicate with an authentication system, such as a real-time authentication (RTA) system that performs voice biometric authentication. The system may further provide RTFP and may utilize text-independent voice biometrics on voiceprints and use speech-dependent phoneme pattern comparison on phoneme sequences extracted from voiceprints. In this regard, at interaction 1, the incoming audio for the voice communications is buffered by a real-time voice buffer (RTVB) 202. Once buffered, RTVB 202 may then send the buffered audio, such as at every X seconds of buffered audio, to a biometrics engine 204, at an interaction 2. Biometrics engine 204 may correspond to an engine that performs authentication, fraud detection, and other voice biometric operations. This may include a proprietary voice biometrics engine of a service provider. The timing of X may be pre-selected by a user or agent, or may be set based on rules or other inputs such as current system load.

At an interaction 3, biometrics engine 204 may obtain fraudster SEP watchlist information from one or more resources, including a database 214 and/or a database 220. The fraudster SEP watchlists may be generated by and/or with an authentication center 206, which may allow one or more users to create, delete, and/or manage fraudster SEP watchlists. Once generated, those watchlists may be stored by databases 214 and/or 220 and may be provided to biometrics engine 204. The fraudster SEP watchlists may provide those fraudster phoneme sequences to biometrics engine 204 in order to perform the authentication, fraud detection, and other voice biometric operations. Authentication center 206 may allow users to interact with a service provider system for managing fraudster SEP watchlists for RTFP.

In order to create and/or update fraudster SEP watchlists, at an interaction 4, results of RTA and RTFP are provided from biometrics engine 204 to a call server 208. Call server 208 manages calls and other voice communications that are recorded in the system for RTVB 202, biometrics engine 204, and authentication center 206. In call server 208, a proactive fraudster exposure (PFE) rule manager 210 may tag relevant PFE calls according to one or more defined PFE rules, at an interaction 5. Call server 208 and PFE rule manager 210 may interact with database server 212, at an interaction 6, where database server 212 may manage interactions with the databases of the corresponding service provider and/or voice biometric system. These databases may include interactions database 214 that, at an interaction 7, receives, stores, and holds for processing the pending PFE interactions, voice prints, and phoneme sequences (e.g., potential fraudster phoneme sequences).

At interactions 8 and 9, a fraud exposure engine 216 may receive PFE call interactions and audio signals or audio data files (e.g., data files from calls and other voice communications) from interactions database 214 and a storage center 218, respectively. Storage center 218 may hold archived calls as media data files, which may include those calls associated with PFE interactions. Fraud exposure engine 216 may process those files and generate phoneme sequences and voice prints. Fraud exposure engine 216 may perform phoneme sequence extraction. Fraud exposure engine 216 may perform voice print creation and then voice print clustering using one or more clustering algorithms based on the corresponding vectors (e.g., k-means clustering or another clustering algorithm that mathematically clusters voice prints according to their vector representation in N-dimensional space). Fraud exposure engine 216 may further provide voice prints and/or phoneme sequences back to database 214 for storage. At an interaction 10, database 220 may be accessed to retrieve the PFE application data. Interactions may be grouped or clustered based on voiceprints associated with each interaction: for example a process may extract a voiceprint from each call interaction, and cluster the resulting voiceprints, such that interactions are clustered by proxy based on the clustering of their associated voiceprints.

At interactions 11 and 12, a fraud exposure backend 222 and a fraud exposure frontend 224 may interact in order to review fraudster voice prints, fraudster phoneme sequences, voice print clustering, fraudster SEP watchlists, and fraudster voice print watchlists. These may include text-independent fraudster voice print watchlists, text-dependent fraudster voice print watchlists and fraudster SEP watchlists. Thus, fraud exposure backend 222 may serve fraud exposure frontend requests with the components of diagram 200. Fraud exposure engine 216 may generate and/or create watchlists automatically, but fraud exposure frontend 224 may provide an application, interface, or the like where a user, administrator, data scientist, or the like can define new rules, review clustering results, manage the clustering results, and/or add new fraudsters and their corresponding voice print(s) and/or phoneme sequences to one or more watchlists. A fraudster or other person or entity may be added to a watchlist if phoneme sequences, audio recordings, interactions, or other data that correspond to the fraudster (e.g. are spoken by the fraudster) are determined to be suspected of fraud as determined by methods discussed herein. These processes and operations generate fraudster voice prints, fraudster phoneme sequences, SEP watchlists, and voice print watchlists, as well as perform the RTFP using the text-dependent voice biometrics, are discussed in further detail with regard to FIGS. 3, 4, 5, and 6.

Figure 3:
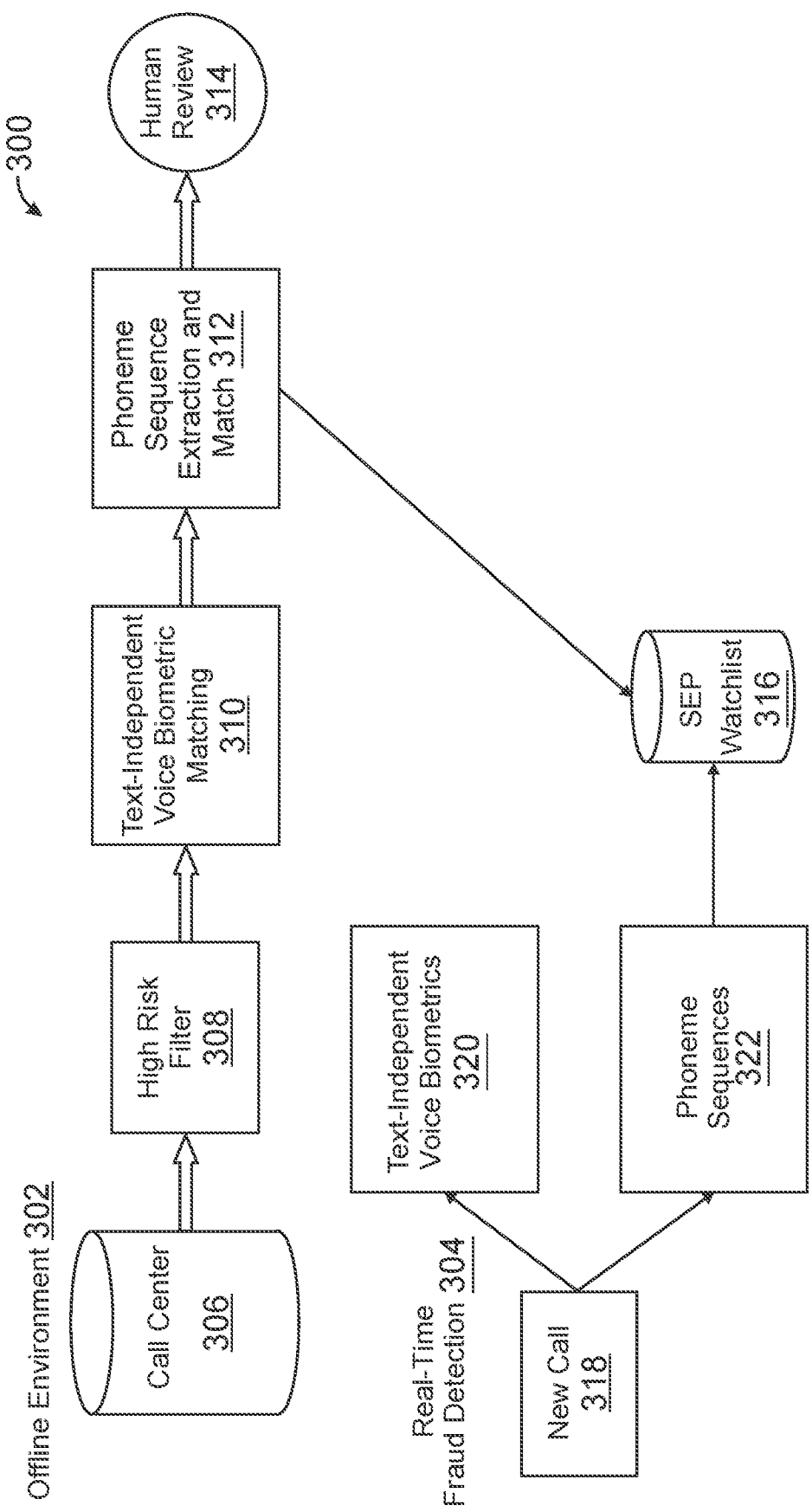
FIG. 3 is a simplified diagram of a system environment for converting phone calls to phonemes for SEP fraudster watchlists used in real-time fraud detection according to some embodiments of the present invention.

FIG. 3 is a simplified diagram of a system environment for converting phone calls to phoneme sequences for phoneme sequence fraudster watchlists used in real-time fraud detection according to some embodiments. Diagram 300 of FIG. 3 includes example operations performed during voice biometric authentication and/or RTFP. For example, diagram 300 may be utilized by voice biometric application 130 discussed in reference to environment 100 of FIG. 1. The components of diagram 300 may be used during voice authentication and fraud detection through incoming phoneme sequence comparison with fraudster phoneme sequences in one or more SEP watchlists. In this regard, diagram 300 displays text-independent and text-dependent voice biometrics.

In diagram 300, an offline environment 302 may serve as a preprocessing environment where incoming calls and their corresponding audio data files stored in interactions databases are processed for use in voice biometrics and phoneme sequence matching in a real-time fraud detection 304. Call center calls 306 (which may be calls or other voice interactions, including VOIP or voice chatting) may be initially recorded and archived by a recording system. Post recording, a high risk filter 308 may be applied in order to identify whether any call center calls 306 are considered "high risk" or not. High risk filter 308 may for example implement one or more rule engines that include data such as business data, authentication failures, agent designations, group of agents reviewing or processing the calls, and the like.

When one or more call center calls 306 are considered high risk, high risk filter 308 may pass the high risk call(s) to a text-independent voice biometric matching 310. Text-independent voice biometric matching 310 may include a clustering engine that detects similarities between calls that may appear to be unrelated. Calls may be related, for example, by clustering or grouping (e.g. by k-means clustering or another clustering algorithm that mathematically clusters voice prints according to their vector representation in N-dimensional space) of text-independent voice biometric matching 310 based on similar audio features of a potential fraudster in the calls. Thus, text-independent voice biometric matching 310 may output one or more groups or clusters of a calls that have the same or similar voice (e.g. based on vector representations of the voiceprints) and therefore may identify a potential fraudster.

Thereafter, a phoneme sequence extraction and match may be performed by a phoneme matching 312 using for example a phoneme engine (e.g. text-dependent phoneme engine 136 of FIG. 1) that searches for two or more suspected or putative fraudster audio data files having audio signals which after being converted to phoneme sequences indicate the same or similar person speaking a matching or similar phoneme. The voiceprints which identified a potential fraudster in step 310 may have an underlying audio signal, which may be for example, any two or more high risk calls from call center calls 306 which may have acoustic sequences and/or audio signals with similar phonemes. Acoustic signals and audio signals include distinct units of sound that may be specific to a certain fraudster and may exhibit the underlying representation of a fraudster's speech patterns. For example, a fraudster with a British English accent may pronounce the word—niche—with a pronunciation such as "/neesh/". However, for a fraudster speaking in American English, the fraudster may pronounce the word as "/nich/". Differences in pronunciation, tongue, grammar, syntax, or any other defining quality of a speaker may be captured by phonemes. A sequence of phonemes may represent a certain phrase that has been pronounced by the fraudster, such as in English, or any other language.

Each pronunciation sequence may be converted to phonemes by a phonetic standard. A popular phonetic standard such as the International Phonetic Alphabet (IPA) may be used, including 107 sound symbols, 52 diacritics (e.g. accents) and 4 prosodic marks (intonations) encompassing virtually every phoneme used in every language on Earth. Other phoneme representations may be used. For any given audio spoken by a person, it may be possible to identify the associated phonetic symbols in order to represent all possible sounds a person may produce. Audio signals may be processed through a signal processing algorithm such as the CMUSphinx phoneme recognition algorithm or the Allosaurus phoneme recognition algorithm that converts an audio signal or an acoustic sequence to a vectorized phoneme representation. By analyzing acoustic sequences and audio signals, the similar phoneme sequences may be independent of automatic speech recognition (ASR), language, or any combination thereof. The operations and processes for identifying and matching similar phoneme sequences are discussed in further detail with regard to FIG. 4.

Once similar phoneme sequences of one or more putative fraudster audio data files are identified and matched, the corresponding audio and audio signals from the files may be sent for addition to or enrollment in the SEP watchlist 316 for utilization by a voice biometric engine. The audio (e.g. audio recordings, digital audio files, etc.) from the files is converted to phoneme sequences by a biometric operation that seeks to vectorize the audio into phoneme sequence vectors or another mathematical representation. For example, a vector may include a number of dimensions or features utilized to mathematically represent the data for the underlying audio signals. Thus each of matched phoneme sequences in the SEP watchlist 316 may be generated by converting the audio signals for the two or more putative fraudster audio files into phoneme sequences that match each other. A corresponding threshold for a phoneme sequence comparison or match may be set for each of the phoneme sequences 316, for each SEP watchlist having one or more phoneme sequences 316, and/or for the voice biometric system for voice biometrics. Alternately, the same threshold may be used for all phoneme sequences and/or for all other entities.

Thresholds may be set per each phoneme sequence based on the context of the identified phoneme. A context, as described herein, may be any measure of idiosyncrasy of speech. For example, for parts of speech, the use of pronouns or adjectives may be more idiosyncratic than other parts of speech such as common nouns. For example, if an individual uses certain pronouns, such as a specific name of a company (e.g. company name "Xfinity"), the threshold for a phoneme match may be set higher in order to accurately corroborate that a fraudster saying a certain phrase is precisely saying the certain phrase. In other embodiments, a threshold may be set for each fraudster, such that a group of phoneme sequences may identify a particular fraudster. For example, a particular fraudster may be defined by a group of phoneme sequences. If, for example, a threshold was set for a particular fraudster to be 80%, then the average of all phoneme sequences defined in that group may need to be 80% before identifying a potential fraudster and producing a match.

While embodiments perform matching and enrollment automatically, via computer, in one or more embodiments, human review 314 via an application may be performed for a phoneme match 312 and enrollment of phoneme sequences in SEP watchlist 316, e.g. periodically.

Thereafter, real-time fraud detection 304 may be executed to provide RTFP voice print watchlists and SEP watchlists having corresponding phoneme sequences. A RTFP watchlist may encompass all watchlists of the RTFP systems, including the SEP watchlists. A new call 318 may be detected and arrive at a call center or other voice communication channel. An agent may handle the call and implement real-time fraud detection 304 with a corresponding CRM system and/or phone call service. New call 318 may be processed, by buffering and sending buffered audio every X seconds, for text-independent voice biometrics 320. The buffered audio may be converted by extracting one or more phoneme sequences that are processed for RTFP. Further, the buffered audio and/or phoneme sequence(s) may be sent for voice biometrics 322 to compare the buffered audio and/or phoneme sequence to the fraudster SEP watchlist 316 for a match. The operations and processes for performing real-time fraud detection using phoneme sequences and watchlists are discussed in further detail with regard to FIG. 5.

Figure 4:
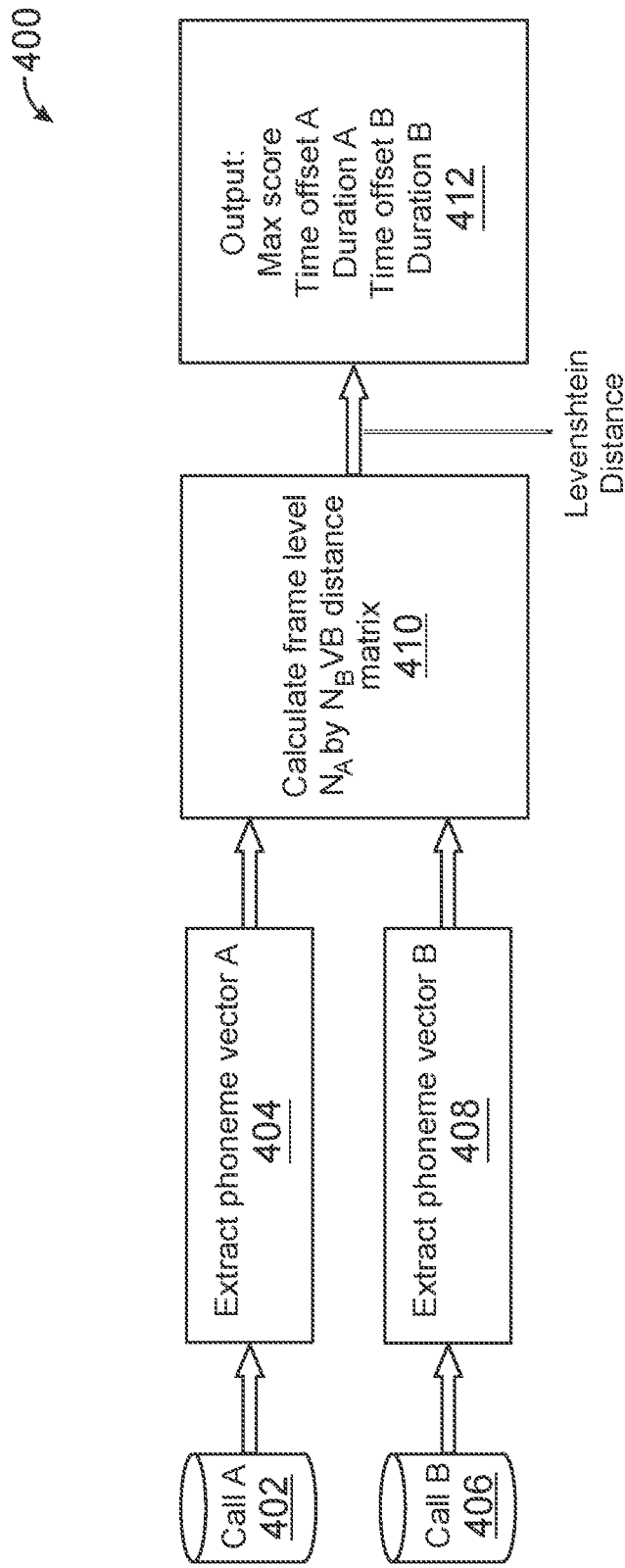
FIG. 4 is a simplified diagram of an exemplary process for determining whether two putative fraudster phoneme sequences include repetitive fraudster phoneme sequences according to some embodiments of the present invention.

FIG. 4 is a simplified diagram of an exemplary process for determining whether two (e.g. a pair) of putative fraudster phoneme sequences extracted from voice prints or audio data files includes similar or repetitive fraudster phoneme sequences according to some embodiments of the present invention. Diagram 400 of FIG. 4 includes operations performed when determining similar fraudster phoneme sequences for use in speech-dependent RTFP. For example, diagram 400 may be utilized by voice biometric application 130 discussed in reference to environment 100 of FIG. 1 when training a machine learning (ML) phoneme pattern comparison system using phoneme sequences. In this regard, diagram 400 includes a process to output a highest rated and/or best score (e.g. most similar) during comparison of phoneme sequences in order to perform identification of similar phoneme sequences in putative fraudster audio files.

In diagram 400, initially a call A 402 has a phoneme vector A 404 extracted and call B 406 has a phoneme vector B 408 extracted. This may be done by having an audio signal for call A 402 and call B 406 from the customer or user side processed using a voice activity detector (VAD) classifier. The VAD classifier may utilize an ML algorithm such as a neural network to find areas of speech and ignore areas of silence, ambient or auxiliary noises, and/or music from the speech. This may be done using an ML model trained for VAD classification using an ML algorithm. For example, ML models utilized to perform one or more of the operations described herein may include three groupings of layers—an input layer, one or more hidden layers, and an output layer having one or more nodes, however, different layers and different numbers of layers may also be utilized. For example, as many hidden layers as necessary or appropriate may be utilized.

Nodes are connected to nodes generally in an adjacent layer. In this example, an ML model receives a set of input values and produces one or more output values, for example, in the case of speech identification, whether the audio includes speech and what the audio signals are for the speech. The outputs may correspond to a score and/or output classification. However, different, more, or fewer outputs may also be provided based on the training. When the ML model is used, each node in the input layer may correspond to a distinct attribute or input data type derived from the training data provided by service provider server 120. In a nonlimiting example, the input nodes may include voice prints and/or phoneme sequences, which may or may not include annotations.

In some embodiments, each of the nodes in the hidden layer generates a representation, which may include a mathematical computation (or algorithm) that produces a value based on the input values of the input nodes. The mathematical computation may include assigning different weights to each of the data values received from the input nodes. The hidden layer nodes may include different algorithms and/or different weights assigned to the input data and may therefore produce a different value based on the input values. Each node in a hidden layer may be connected to the nodes in the adjacent hidden layer such that nodes from the input layer may be connected to nodes in the hidden layer(s), and nodes in the hidden layer may be connected to nodes and corresponding outputs in output layer. The values generated by the hidden layer nodes may be used by the output layer node to produce an output value for the ML model. When the ML model is used to determine speech and/or score comparisons of voice prints, the output values produced by the ML model may indicate a likelihood that audio is speech or ancillary background noise, or that two or more voice prints include the same or similar speech or text based on acoustics.

The ML model may be trained by using training data, which may also be prepared by converting data to numerical representations and vectors. By providing training data to the ML model, the nodes in the hidden layers may be trained (e.g. adjusted) such that an optimal output (e.g., a classification) is produced in the output layer based on the training data. By continuously providing different sets of training data and penalizing the ML model when the output of the ML model is incorrect, the ML model (and specifically, the representations of the nodes in the hidden layer) may be trained (adjusted) to improve its performance in data classification. Adjusting the ML model may include adjusting the weights associated with each node in the hidden layer.

Once speech has been identified and segmented from the audio in the audio data files and signals, a Mel-spaced filter bank phoneme sequence extractor may create sixteen log energy features per each 10 ms of speech (e.g., 100 frames per second). These filter banks are then linearly transformed to create, for example, sixteen phonemes that are used for computing phoneme distances for phoneme vector A 404 and phoneme vector B 408 (numbers of phonemes other than 16 may be used). Thereafter, a phoneme level $N_A$ by $N_B$ distance matrix 410 is calculated. In order to calculate phoneme level $N_A$ by $N_B$ distance matrix 410, for each phoneme $A=0 \ldots N_A$ and $B=0 \ldots N_B$, a distance, such as a Levenshtein distance, also known as "edit distance" may be computed between the corresponding phonemes, where $N_A$ and $N_B$ are the number of phonemes in call A 402 and call B 406, respectively. Typically, $N_A$ and $N_B$ may each have a length of 16, corresponding to the 16 phonemes of each respective phoneme vector. The Levenshtein distances are then stored in phoneme level $N_A$ by $N_B$ distance matrix 410. Other distances may be used.

To calculate the Levenshtein distances in the phoneme level $N_A$ by $N_B$ distance matrix 410, phoneme vector A 404 and phoneme vector B 408 are compared. Typically, Levenshtein distances may be calculated using letters, however, FIG. 9 is an example of a calculation of a Levenshtein distance matrix using phonemes instead of letters according to embodiments of the invention. FIG. 9 presents a common English word, "Oregano" that may be pronounced differently according to an individual speaking. For example, typically, in American English, an individual may pronounce—oregano—as "/Oh/ray/ga/no/", however, an individual speaking the British English tongue may pronounce oregano as "/Orah/ga/no/". Shown in FIG. 6, each phoneme sequence vector occupies one dimension of the Levenshtein distance matrix, with each phoneme sequence vector broken up by its individual phonemes and placed in either the row header ("/Orah/ga/no/") or the column header ("/Oh/ray/ga/no/"). The Levenshtein distance matrix 410 may be calculated at the phoneme level and a pair of phoneme vectors may be created for the pair of phoneme sequences and initialized in a 1-indexed (e.g. offset by 1, as in computer systems, arrays and matrices are 0-indexed) $N_A \times N_B$ distance matrix. In this example for—oregano—, the British English tongue occupies the row header and therefore $N_A=3$ and is indexed by I, and the American English tongue occupies the column header and therefore $N_B=4$ and is indexed by j. The value of I represents a subset of vector A terminating at i with a max value of $N_A$, whereas the value of j represents a subset of vector B terminating at j with a max value of $N_B$. For example, if i=2, the subset of vector A would be "/Orah/ga/". In another example, if j=1, the subset of vector B would be "/Oh/".

Thereafter, each element of the distance matrix is filled according to the piecewise function shown below in example Formula 1:

$$lev_{A,B}(i, j) = \begin{cases} \max(i, j) & \text{if } \min(i, j) = 0 \\ \min \begin{cases} lev_{A,B}(i, j-1) + \text{cost of insertion} \\ lev_{A,B}(i-1, j) + \text{cost of deletion} \\ lev_{A,B}(i-1, j-1) + \text{cost of substitution }_{(A_i \neq B_j)} \end{cases} & \text{otherwise} \end{cases}$$

Formula 1

Formula 1 calculates the Levenshtein distance $lev_{A,B}$ (i,j) between phoneme vector A and phoneme vector B given a match or mismatch between the terminating phonemes of the subset at index i of vector A and terminating phoneme of the subset at index j of vector B. For example, the terminating phoneme for the phoneme vector "/Oh/ray/ga/no/" at index number 2 is therefore the phoneme "/ray/". The Levenshtein distance may be used to observe the cost required to perform an insertion, deletion, or substitution operation on phonemes to modify one phoneme sequence to another. The costs for edits may be different for each operation and is not limited as such. However, for simplicity of demonstration, the cost of each operation may be assumed to be equal to 1 in the example. Typically, as known in the art, traversing the Levenshtein distance matrix assumes a deletion operation in the left-right direction, an insertion operation in the top-down direction, and a substitution operation diagonally. To begin, the matrix is first initialized with the first row and first column filled with the Levenshtein distances of a phoneme to an empty phoneme (e.g. no phoneme). For example, the edit distance for the phoneme "/Oh/ray/" requires 2 deletions to an empty phoneme and therefore requires a Levenshtein distance of 2 (matrix element at position 0,2), the edit distance for the phoneme "/Orah/" requires 1 insertion to an empty phoneme (matrix element at position 1,0), therefore, the Levenshtein distance directly corresponds with the index value of the phoneme vector upon initialization.

The piecewise function of Formula 1 first initializes the Levenshtein distance matrix by calculating the max value of the indices i and j if and only if one of the indices is 0 (e.g. if min(i,j)=0). Therefore, this initializes the Levenshtein distance matrix to have the first row (e.g. row headers) and first column (e.g. column headers) directly correspond with the index number of the element and reflect the Levenshtein distance of a phoneme to an empty phoneme, vice versa. After initialization of the first row and column, the remaining Levenshtein distances for phonemes at position i of vector A may be compared to a phoneme at position j of vector B and a distance calculated accordingly. For example, to calculate the Levenshtein distance for $lev_{A,B}=(1,1)$ which corresponds to $A_1$="Oh" from vector A and $B_1$="Orah" from vector B, the phonemes are compared for a match. Clearly, these are not the same phoneme and not a match, therefore, the Levenshtein distance may be computed for three different Levenshtein distances and each added with three respective costs; a cost of insertion, a cost of deletion, and a cost of substitution according to Formula 1. Visually, this equates to examining the matrix elements at quadrants MIMI, shown in FIG. 9 (assuming the current evaluated matrix element is at quadrant IV) and adding a corresponding cost to each quadrant, thereafter choosing a minimum value (according to Formula 1). The cost of insertion may be added to quadrant III, the cost of deletion may be added to quadrant I, and the cost of substitution may be added to quadrant II. Therefore, the Levenshtein distance at index 1,1 may be calculated below as following:

$$lev_{A,B}(1, 1) = \left\{ \min \left\{ \begin{array}{l} lev_{A,B}(1, 0) = 1 + \text{cost of insertion} = 2 \\ lev_{A,B}(0, 1) = 1 + \text{cost of deletion} = 2 \\ lev_{A,B}(0, 0) = 0 + \text{cost of substitution} = 1_{(A_i \neq B_j)} \end{array} \right. \text{otherwise} \right.$$

In one example the cost of each operation (e.g. insertion, deletion, or substitution) is assumed to be 1. The minimum of the three functions for an insertion operation, deletion operation, or substitution operation is therefore the substitution operation with the total cost of 1. The only operation required to change the phoneme $A_1$="/Oh/" from vector A and $B_1$="/Orah/" from vector B is a substitution operation changing $A_1$="/Oh/" to "/Orah/" with the cost of 1. The other operations (insertion and deletion) requires a cost of 2, therefore these are not the minimum distances. If, however, the phoneme elements match, for example in calculating the Levenshtein distance at $lev_{A,B}$ (2,3), the phonemes "/ga/" match, there should be no edits, therefore, the Levenshtein distance is the same as the Levenshtein distance of the previous element of the distance matrix $lev_{A,B}$ (i−1,j−1). For example, if there is a match of phonemes at the current element of $lev_{A,B}$ (2,3) as in the match for the phoneme $A_2=B_3$="/ga/", then the Levenshtein distance at $lev_{A,B}$ (2,3) =$lev_{A,B}$ (1,2)=2. Visually, this equates to the value in quadrant II with the assumption that the currently evaluated matrix element has matching phonemes and is at quadrant IV. The Levenshtein distances are then stored in the phoneme level $N_A \times N_B$ matrix 410.

Figure 8:
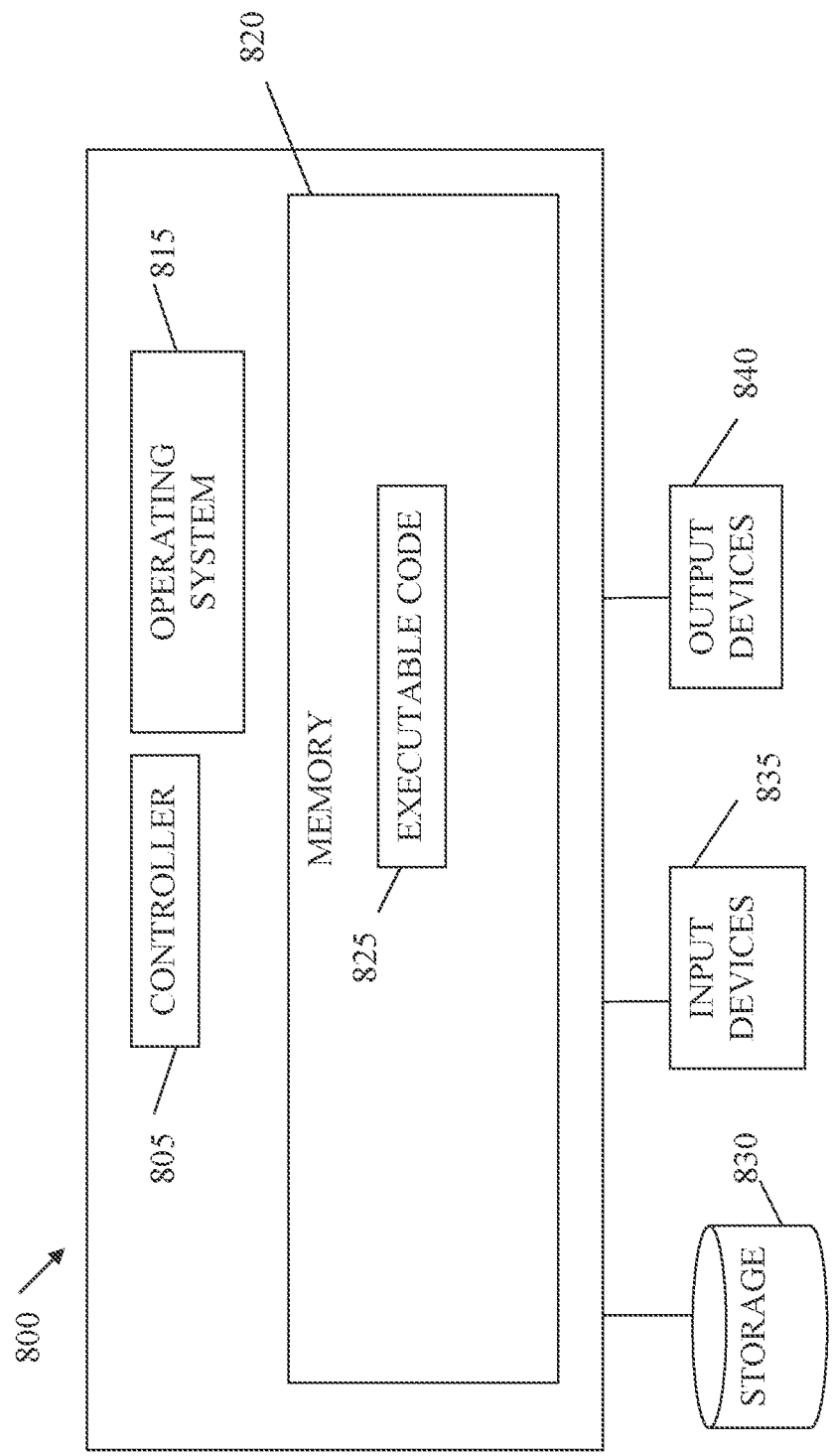
FIG. 8 is a block diagram of an exemplary computing device, according to some embodiments of the present invention.

The last value of the Levenshtein distance matrix (e.g. element $N_A$, $N_B$, the element in the final row and the final column of the matrix, at index i=3, j=4 in the foregoing example) may be considered to be a similarity score between a first phoneme vector A and a second phoneme vector B, e.g. between two phoneme sequences. Other methods of creating a similarity score between phonemes may be used. In this example, the last element $lev_{A,B}$ (3,4)=2, therefore, the similarity score between the phoneme "/Oh/ray/ga/no/" and "/Orah/ga/no/" is therefore 2. In some embodiments, a similarity score may be converted to a percentage or ratio. Turning to FIG. 8, two compared phoneme sequences may be calculated for a maximum edit distance. The maximum edit distance may be calculated as the Levenshtein distance if the two compared phoneme sequences had no commonalities. Therefore, the maximum edit distance is typically the maximum of the size of either phoneme vector A or phoneme vector B. Therefore, the maximum edit distance may be calculated as: max($N_A,N_B$). In the above example, the maximum edit distance may be calculated as max($N_A$=3, $N_B$=4)=4. Therefore, whereas the Levenshtein distance was calculated as 2 in the above example, when converted to a percentage or ratio, this represents a 50% similarity (2 edits/4 maximum edits). The similarity score may be compared to a threshold. For example, a threshold value may be set such that any similarity score below 80% is not considered a phoneme sequence match. Therefore, in order to obtain a phoneme sequence match between two phoneme sequences, the similarity score must meet or exceed the threshold, e.g. a threshold set by the user. Other scales and intervals may be used, and embodiments of the invention are not limited as such and may use any scale or interval to represent a similarity score and/or threshold. The phoneme sequences with similarity scores which meet or exceed the threshold set may be added to a phoneme SEP watchlist.

Thereafter, an output 412 may correspond to a best or highest score in a comparison that is returned with a start and end time in each of call A 402 and call B 406. Audio data files with high or good scores may often have correct matches that correspond to the same person stating the same phonemes (e.g., a fraudster repeating a phoneme sequence during different audio calls to engage in fraud, such as based on a scripted attempt at fraud). Thus, clusters with a highest score may be presented to a reviewer first as they may be likely to have the same person in different calls for call A 402 and call B 406.

Figure 5:
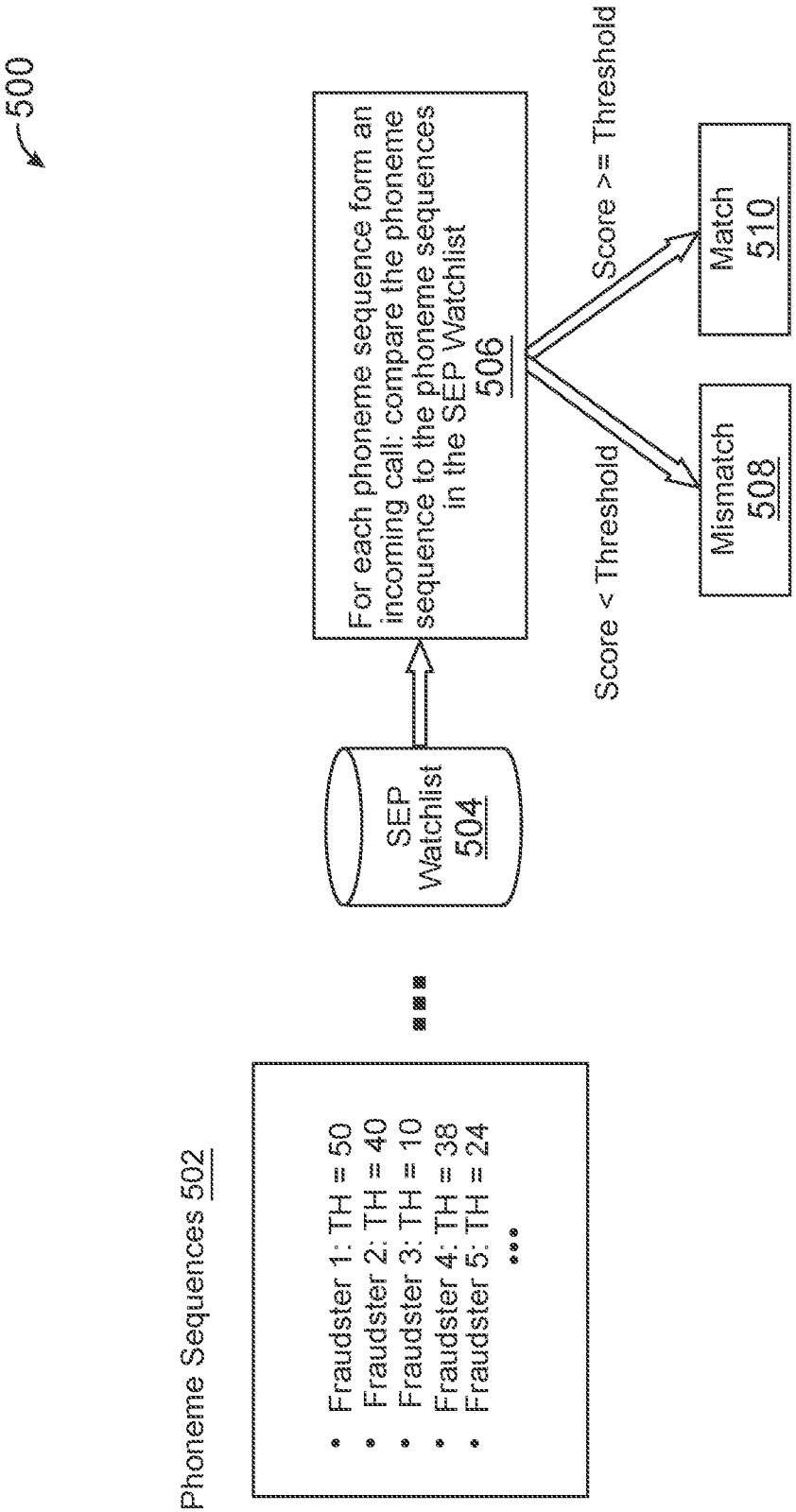
FIG. 5 is a simplified diagram of an exemplary process for performing real-time fraud detection using a SEP fraudster phoneme watchlist that includes phoneme sequences having repetitive fraudster phoneme sequences according to some embodiments of the present invention.

FIG. 5 is a simplified diagram of an exemplary process for performing real-time fraud detection using a phoneme SEP watchlist that includes phonemes having repetitive phoneme sequences according to some embodiments. Diagram 500 of FIG. 5 includes operations performed during voice biometric systems and RTFP using repetitive phoneme sequences. For example, diagram 500 may be utilized by voice biometric application 130 discussed in reference to environment 100 of FIG. 1 when performing voice biometrics using phonemes of fraudsters. For example, diagram 500 may be utilized by voice biometric application 130 discussed in reference to environment 100 of FIG. 1 when performing voice biometrics using phoneme sequences of fraudsters repeating the same or similar phonemes. In this regard, diagram 500 includes a process to output a mismatch 508 or a match 510 of an incoming call to repetitive fraudster phoneme sequences in putative fraudster audio files.

In diagram 500, a call may be initiated by a user with a voice communication system, such as with an agent at a call center for a service provider. The call may be captured by a voice recording and RTFP system using voice biometrics and fraudster phoneme SEP watchlists. Every X seconds, the audio signals from the incoming call is buffered and sent for RTFP using a voice biometric system. The buffered audio signals are converted to a phoneme sequence, for example, by exacting a phoneme sequence vector. Thereafter, phoneme sequences 502 in SEP watchlist 504 are used for phoneme comparison and RTFP in a phoneme pattern comparison engine and system. In each embodiment throughout this disclosure, the term "X seconds" has been used and may be the same or a different amount, and may be modified or changed as described herein or as otherwise modified as known by those of ordinary skill in the art.

For example, each fraudster phoneme sequence 502 may be associated with a corresponding threshold (TH) shown in diagram 500. Each TH for the corresponding fraudster phoneme sequence indicates a threshold score or match that would be optimal or selected for the corresponding fraudster. In other embodiments, a single TH for a watchlist or a subset of a watchlist (e.g., multiple fraudster phoneme sequences) may be used, or a TH may be used across multiple or all watchlists in a voice biometric system. The THs may be determined based on customer data, tests using ongoing data collection, preferences and/or administrator settings, and the like.

With a given phoneme sequence from an incoming call, the phoneme sequence may be compared to phoneme sequences 502 in SEP watchlist 504 during phoneme sequence comparison 506. A phoneme pattern comparison engine may be used to compare phoneme sequences (e.g. based on vectors for phoneme sequences) and generate a score (e.g. from the Levenshtein distance matrix). This may be performed in a loop (e.g. iteratively) using phoneme sequences 502, which may be done in parallel or sequentially. Once scores are output, the scores may be compared and/or weighed against the corresponding TH established for the phoneme sequence, the watchlists, or all watchlists. If the score is less than (or equal to, in some embodiments) the TH, then mismatch 508 may be output by the voice biometric engine. This may indicate no match and further monitoring may be conducted. However, if the score is equal to or higher than the TH, match 510 may be output. Match 510 may cause an alert to be presented to the corresponding agent or employee on the call. Match 510 may further cause RTFP to be implemented by securing data and/or preventing access to certain data, as well as reporting the call and/or potentially fraudulent user to an administrator, authority, or the like. Thus, when a response causes match 510, the response may trigger an alert that may be sent to the agent via an event, API call, or as a result of an already triggered API (e.g., at the beginning of the call, the agent's software for the call triggers a "Detect Fraud" API). There may be an API integration between the voice biometric system and the agent's software used for the call. In contrast, mismatch 508 may cause the voice biometric system to take another voice print and extract a phoneme sequence and/or section of audio from the call for further monitoring and RTFP using voice biometrics. Embodiments of the invention may be combined with prior fraud detection methods to generate a more sophisticated decision result. For example, a match of a phoneme sequence to a SEP watchlist fraudster with an additional match to a fraudster voice print such as text-independent or text-dependent voice biometrics (e.g. phrase matching) may generate a "strong" match result. A strong match result may bolster a match result to provide a more accurate and reliable result.

Figure 6:
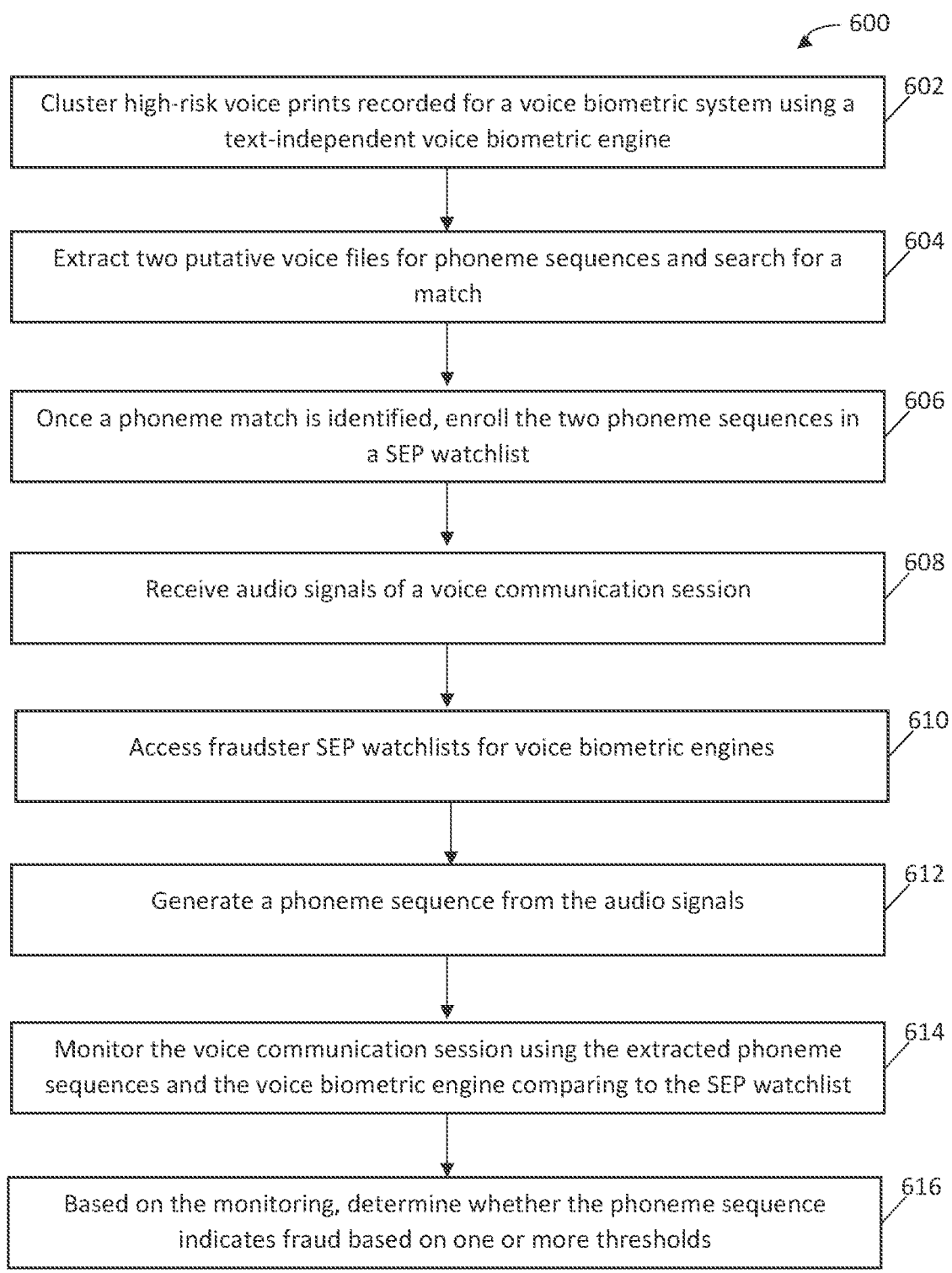
FIG. 6 is an exemplary flowchart for performing real-time fraud prevention using fraudster SEP watchlists in a voice biometric authentication and fraud detection system according to some embodiments of the present invention.

FIG. 6 is an exemplary flowchart for performing real-time fraud prevention using fraudster SEP watchlists in a voice biometric authentication and fraud detection system according to some embodiments. In some embodiments, generation and utilization of a voice biometric system for real-time fraud detection as described in method 600 of FIG. 6 can be implemented and performed using an online service provider system, such as service provider server 120. One or more processes 602-616 of method 600 may be implemented, at least in part, in the form of executable code stored on a non-transitory, tangible, machine-readable media that when executed by one or more processors may cause the one or more processors to perform one or more the processes 602-616. In some embodiments, method 600 can be performed by one or more computing devices in environment 100 of FIG. 1.

At step 602 of method 600, high-risk voice prints recorded for a voice biometric system are grouped or clustered using at text-independent voice biometric engine. The high-risk voice prints may be identified based on a rule-based engine and one or more data processing rules, or on a ML model trained to identify high-risk voice prints from corresponding data and/or voice print vectors. A text-independent voice biometric engine may cluster voice prints based on the vectors for the voice prints to identify similar voice prints of the same or similar user. At step 604, two putative voice files are extracted for phoneme sequences. The phoneme sequences may be for a potential fraudster that is likely to repeat the same or similar phoneme sequences when engaging in fraud. Thus, the phoneme sequences may be searched for a match based on a similarity score determined by a Levenshtein distance.

At step 606, once the two putative phoneme sequences are identified, the two phoneme sequences are enrolled in a SEP watchlist and linked to a fraudster and threshold. The phoneme sequences are enrolled by converting audio signals for the files into phoneme sequences (e.g., by vectorizing) and storing the corresponding phoneme sequences to a SEP watchlist. The phoneme sequences may also be associated with a threshold for a particular fraudster, set of fraudsters, watchlist, and/or set of watchlists. For example, the threshold may require a matching score of 75 or better. This watchlist is then used by the voice biometric engine for RTFP and other voice biometric processing.

At step 608, audio signals of a voice communication session are received. The audio signals may be buffered in real-time buffer system and storage, and every X seconds of audio signals may be sent for conversion to and/or extraction of a corresponding phoneme sequence for the incoming audio signals of the voice communication session. This may be done in real-time or near-real time (e.g, less than about 5 seconds, preferably less than about 2 seconds) to provide RTFP. At step 610, fraudster SEP watchlists for voice biometric engines are accessed. The watchlists may include phoneme sequences so that comparison and scoring may be made based on comparing the phoneme sequences for the incoming audio signals to the phoneme sequences in the watchlist. Thus, at step 612, a phoneme sequence is generated from the audio signals. This includes generating a phoneme sequence by procedurally computing a vector or other mathematical representation from the audio signals. Other methods of developing phoneme sequences may be used.

At step 614, the voice communication session is monitored using the extracted phoneme sequences and the voice biometric engine comparing the phoneme sequence to the SEP watchlist of fraudster phoneme sequences. Text-independent and text-dependent watchlists may be used simultaneously for comparison of voice prints during the voice communication session. Each comparison may output a corresponding score, which may then be compared with and weighed against the threshold for each phoneme sequence in SEP watchlists. At step 616, based on the monitoring, it is determined whether the phoneme sequences indicates fraud based on one or more thresholds. If below the threshold(s), no fraud and a mismatch may be output and additional steps for RTFP may be executed.

Figure 7:
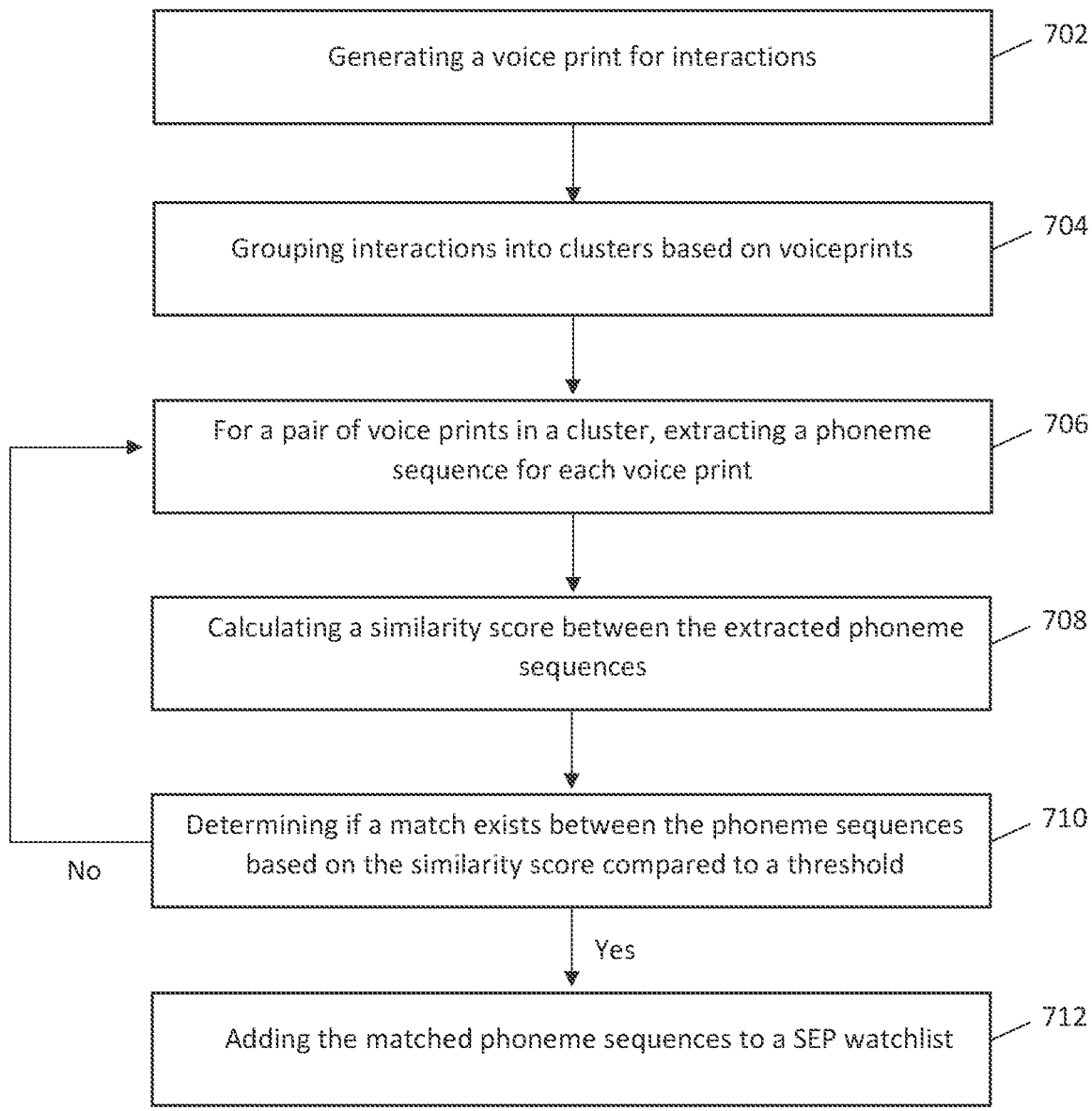
FIG. 7 is an exemplary flowchart for adding a phoneme sequence to a SEP watchlist according to embodiments of the present invention.

Reference is made to FIG. 7, which shows an exemplary flowchart for adding phonemes to a SEP watchlist. At step 702, a voice print may be generated for each interaction of a plurality of interactions. For example, interactions received as part of incoming calls or other voice communications may have a voice print generated. At step 704, interactions may be grouped into clusters based on the voice prints. Interactions may first be identified as "high risk" or otherwise potentially fraudulent. This may be done using a high risk filter, such as based on pre-defined criteria, business data, authentication failures, designation by one or more agents, and the like, and combinations of each of the foregoing. Thereafter, text-independent voice biometric matching may then be used to cluster calls, audio data files, and/or voice prints into clusters that have the same or similar voice (e.g. based on sound, tone, volume, language, speech, etc.) each voiceprint associated with a speaker's voice based on the generated voice prints.

At step 706, for a pair of voice prints in a cluster, a phoneme sequence may be extracted from the underlying audio signal of each voice print (e.g. the interaction and/or audio signal linked to the respective voice prints). For example, phoneme sequences may be extracted according to the method described in FIG. 4 wherein a pair of similar voice prints may be extracted for a pair of phoneme sequence vectors.

At step 708, a similarity score may be calculated between the extracted phoneme sequences. For example, the phoneme sequence vectors may be compared for a similarity score, such as calculating a Levenshtein distance between the pair of phoneme vectors as described in FIG. 4.

At step 710, the calculated similarity score may be compared to a threshold to determine if there exists a match between the pair of phoneme sequences. If a match exists, the phoneme sequences may be added to a SEP watchlist as in step 712 to be used as described in FIG. 5. However, if no match exists, the process repeats and a different pair of extracted phoneme sequences from voice prints in a cluster of voice prints may be determined for a phoneme sequence match, the process repeating from step 706.

Reference is made to FIG. 8, which shows a block diagram of an exemplary computing device, according to some embodiments of the invention. A device 800 may include a controller 805 that may be, for example, a central processing unit processor (CPU), a chip or any suitable computing or computational device, an operating system 815, a memory 820, executable code 825, a storage system 830 that may include input devices 835 and output devices 840. Controller 805 (or one or more controllers or processors, possibly across multiple units or devices) may be configured to carry out methods described herein, and/or to execute or act as the various modules, units, etc. More than one computing device 800 may be included in, and one or more computing devices 800 may act as the components of, a system according to embodiments of the invention. For example, modules or servers in FIGS. 1-7, e.g. fraud exposure backend 222 and fraud exposure frontend 224 and other modules, may each, or in combination, be or be executed by a computing device as shown in FIG. 8.

Operating system 815 may be or may include any code segment (e.g., one similar to executable code 125 described herein) designed and/or configured to perform tasks involving coordination, scheduling, arbitration, supervising, controlling or otherwise managing operation of computing device 800, for example, scheduling execution of software programs or tasks or enabling software programs or other modules or units to communicate. Operating system 815 may be a commercial operating system. It will be noted that an operating system 815 may be an optional component, e.g., in some embodiments, a system may include a computing device that does not require or include an operating system 815. For example, a computer system may be, or may include, a microcontroller, an application specific circuit (ASIC), a field programmable array (FPGA) and/or system on a chip (SOC) that may be used without an operating system.

Memory 820 may be or may include, for example, a Random Access Memory (RAM), a read only memory (ROM), a Dynamic RAM (DRAM), a Synchronous DRAM (SD-RAM), a double data rate (DDR) memory chip, a Flash memory, a volatile memory, a non-volatile memory, a cache memory, a buffer, a short term memory unit, a long term memory unit, or other suitable memory units or storage units. Memory 820 may be or may include a plurality of, possibly different memory units. Memory 820 may be a computer or processor non-transitory readable medium, or a computer non-transitory storage medium, e.g., a RAM.

Executable code 825 may be any executable code, e.g., an application, a program, a process, task or script. Executable code 825 may be executed by controller 805 possibly under control of operating system 815. Although, for the sake of clarity, a single item of executable code 825 is shown in FIG. 8, a system according to some embodiments of the invention may include a plurality of executable code segments similar to executable code 825 that may be loaded into memory 820 and cause controller 805 to carry out methods described herein.

Storage system 830 may be or may include, for example, a flash memory as known in the art, a memory that is internal to, or embedded in, a micro controller or chip as known in the art, a hard disk drive, a CD-Recordable (CD-R) drive, a Blu-ray disk (BD), a universal serial bus (USB) device or other suitable removable and/or fixed storage unit. Content may be stored in storage system 830 and may be loaded from storage system 830 into memory 820 where it may be processed by controller 805. In some embodiments, some of the components shown in FIG. 8 may be omitted. For example, memory 820 may be a non-volatile memory having the storage capacity of storage system 830. Accordingly, although shown as a separate component, storage system 830 may be embedded or included in memory 820.

Input devices 835 may be or may include any suitable input devices, components or systems, e.g., a detachable keyboard or keypad, a mouse and the like. Output devices 840 may include one or more (possibly detachable) displays or monitors, speakers and/or any other suitable output devices. Any applicable input/output (I/O) devices may be connected to computing device 800 as shown by blocks 835 and 840. For example, a wired or wireless network interface card (NIC), a universal serial bus (USB) device or external hard drive may be included in input devices 835 and/or output devices 840. It will be recognized that any suitable number of input devices 835 and output device 840 may be operatively connected to computing device 800 as shown by blocks 835 and 840. For example, input devices 835 and output devices 840 may be used by a technician or engineer in order to connect to a computing device 800, update software and the like. Input and/or output devices or components 835 and 840 may be adapted to interface or communicate.

Embodiments of the invention may include a computer readable medium in transitory or non-transitory form that may include instructions, e.g., computer-executable instructions, which, when executed by a processor or controller, cause the processor or controller to carry out methods disclosed herein. For example, embodiments of the invention may include an article such as a computer or processor non-transitory readable medium, or a computer or processor non-transitory storage medium, such as for example a memory, a disk drive, or a USB flash memory, encoding, including or storing instructions, e.g., computer-executable instructions, which, when executed by a processor or controller, carry out methods disclosed herein. For example, a storage medium such as memory 820, computer-executable instructions such as executable code 825 and a controller such as controller 805.

The storage medium may include, but is not limited to, any type of disk including magneto-optical disks, semiconductor devices such as read-only memories (ROMs), random access memories (RAMs), such as a dynamic RAM (DRAM), erasable programmable read-only memories (EPROMs), flash memories, electrically erasable programmable read-only memories (EEPROMs), magnetic or optical cards, or any type of media suitable for storing electronic instructions, including programmable storage devices.

Embodiments of the invention may include components such as, but not limited to, a plurality of central processing units (CPU) or any other suitable multi-purpose or specific processors or controllers (e.g., controllers similar to controller 805), a plurality of input units, a plurality of output units, a plurality of memory units, and a plurality of storage units. A system may additionally include other suitable hardware components and/or software components. In some embodiments, a system may include or may be, for example, a personal computer, a desktop computer, a mobile computer, a laptop computer, a notebook computer, a terminal, a workstation, a server computer, a Personal Digital Assistant (PDA) device, a tablet computer, a network device, or any other suitable computing device.

In some embodiments, a system may include or may be, for example, a plurality of components that include a respective plurality of central processing units, e.g., a plurality of CPUs as described, a plurality of chips, FPGAs or SOCs, a plurality of computer or network devices, or any other suitable computing device. For example, a system as described herein may include one or more devices such as the computing device 800.

While certain features of the invention have been illustrated and described herein, many modifications, substitutions, changes, and equivalents may occur to those skilled in the art. It is, therefore, to be understood that the appended claims are intended to cover all such modifications and changes as fall within the true spirit of the invention.

Various embodiments have been presented. Each of these embodiments may of course include features from other embodiments presented, and embodiments not specifically described may include various features described herein.

What is claimed is:

1. A computer-implemented method for proactive fraudster exposure in a customer service center having multiple service channels, the computer-implemented method comprising:
    receiving incoming audio call interactions;
    storing the audio call interactions in an interactions database;
    generating a voiceprint for each of the incoming audio call interactions;
    grouping the audio call interactions in the interactions database into one or more clusters of voiceprints based on the voiceprints generated for the interactions, wherein each one of the one or more clusters is associated with a speaker's voice based on the voiceprints;
    for each pair of voiceprints in a voiceprint cluster:
        extracting a first phoneme sequence for a first voiceprint of the pair of voiceprints and extracting a second phoneme sequence for a second voiceprint of the pair of voiceprints;
        calculating a similarity score between the extracted first phoneme and the extracted second phoneme representation;
        determining if a match exists between the extracted first phoneme sequence and the extracted second phoneme sequence based on a threshold; and
        if a match exists, adding the matched phoneme sequence to a watchlist;
    wherein the similarity score is calculated by:
    creating a first vector for the extracted first phoneme sequence and a second vector for the extracted second phoneme sequence; and
    comparing, between the first vector and the second vector in an indexed i×j matrix, a Levenshtein distance for each i×j element of the matrix between a phoneme sequence of length i of the first vector and a phoneme sequence of length j of the second vector, wherein the distance is a cost to modify the first subset to the second subset, the comparing comprising:
        for each i×j element of the matrix, compare the distance values for three locations, (i, j−1), (i−1, j), and (i−1, j−1);
        if the terminating phoneme of the first subset at index i is equivalent to the terminating phoneme of the second subset at position j, then the i×j element equals the minimum value of the three locations;
        if the terminating phoneme of the first subset at index i is not equivalent to the terminating phoneme of the second subset at position j, then the i×j element is the minimum value of the three locations plus a cost; and
        wherein the similarity score is a final row and final column element of the matrix.

2. The computer-implemented method of claim 1, comprising:
    receiving real-time call interactions;
    filtering a predetermined period of the real-time call interaction, generating a buffered audio signal;
    extracting a phoneme sequence of the buffered audio signal;
    calculating a similarity score between the phoneme sequence of the buffered audio signal and the matched phoneme sequence; and
    if the similarity score is above a threshold, triggering an alert.

3. The computer-implemented method of claim 1, wherein for each pair of voiceprints, a voice activity detector (VAD) is applied to filter speech from non-speech.

4. The computer-implemented method of claim 1, wherein the threshold is set per phoneme sequence based on a context of the phoneme sequence.

5. The computer-implemented method of claim 1, wherein the similarity score is a ratio of the maximum edit distance, wherein the maximum edit distance is a Levenshtein distance of the extracted phoneme sequences with no commonalities.

6. A system for proactive fraudster exposure in a customer service center having multiple service channels, the system comprising:
    a memory; and
    a processor configured to:
        receive incoming audio call interactions;
        store the audio call interactions in an interactions database;
        generate a voiceprint for each of the incoming audio call interactions;
        group the audio call interactions in the interactions database into one or more clusters of voiceprints based on the voiceprints generated for the interactions, wherein each one of the one or more clusters is associated with a speaker's voice based on the voiceprints;
        for each pair of voiceprints in a voiceprint cluster:
            extract a first phoneme sequence for a first voiceprint of the pair of voiceprints and extract a second phoneme sequence for a second voiceprint of the pair of voiceprints;
            calculate a similarity score between the extracted first phoneme and the extracted second phoneme representation;
            determine if a match exists between the extracted first phoneme sequence and the extracted second phoneme sequence based on a threshold; and
    if a match exists, add the matched phoneme sequence to a watchlist;
    wherein the processor is configured to calculate the similarity score by:
        creating a first vector for the extracted first phoneme sequence and a second vector for the extracted second phoneme sequence; and
        comparing, between the first vector and the second vector in an indexed i×j matrix, a Levenshtein distance for each i×j element of the matrix between a phoneme sequence of length i of the first vector and a phoneme sequence of length j of the second vector, wherein the distance is a cost to modify the first subset to the second subset, the comparing comprising:
            for each i×j element of the matrix, compare the distance values for three locations, (i, j−1), (i−1, j), and (i−1, j−1):
            if the terminating phoneme of the first subset at index i is equivalent to the terminating phoneme of the second subset at position i, then the i×j element equals the minimum value of the three locations;
            if the terminating phoneme of the first subset at index i is not equivalent to the terminating phoneme of the second subset at position i, then the i×j element is the minimum value of the three locations plus a cost; and
            wherein the similarity score is a final row and final column element of the matrix.

7. The system of claim 6, wherein the processor is further configured to:
    receive real-time call interactions;
    filter a predetermined period of the real-time call interaction, generate a buffered audio signal;
    extract a phoneme sequence of the buffered audio signal;
    calculate a similarity score between the phoneme sequence of the buffered audio signal and the matched phoneme sequences; and
    if the similarity score is above a threshold, trigger an alert.

8. The system of claim 6, wherein for each pair of voiceprints, a voice activity detector (VAD) is applied to filter speech from non-speech.

9. The system of claim 6, wherein the threshold may be set per phoneme sequence based on the context of the phoneme sequence.

10. The system of claim 6, wherein the similarity score is a ratio of the maximum edit distance, wherein the maximum edit distance is a Levenshtein distance of the extracted phoneme sequences with no commonalities.

11. A computer-implemented method for fraudster exposure comprising:
    generating a voiceprint for each of a plurality of audio interactions;
    grouping the interactions into one or more clusters of voiceprints based on respective voiceprints generated for the audio interactions;
    for each pair of voiceprints in a voiceprint cluster:
        extracting a first phoneme sequence for a first voiceprint of the pair of voiceprints and extracting a second phoneme sequence for a second voiceprint of the pair of voiceprints;
        calculating a score between the first extracted phoneme sequence and the second extracted phoneme sequence;
        determining if a match exists between the first extracted phoneme sequence and the second extracted phoneme sequence based on the calculated score compared to a threshold; and
    if a match exists, adding the matched phoneme sequences to a watchlist;
    wherein the score is calculated by:
        creating a first vector for the extracted first phoneme sequence and a second vector for the extracted second phoneme sequence; and
        comparing, between the first vector and the second vector in an indexed i×j matrix, a Levenshtein distance for each i×j element of the matrix between a phoneme sequence of length i of the first vector and a phoneme sequence of length j of the second vector, wherein the distance is a cost to modify the first subset to the second subset, the comparing comprising:
            for each i×j element of the matrix, compare the distance values for three locations, (i, j−1), (i−1, j), and (i−1, j−1);
            if the terminating phoneme of the first subset at index i is equivalent to the terminating phoneme of the second subset at position j, then the i×j element equals the minimum value of the three locations;
            if the terminating phoneme of the first subset at index i is not equivalent to the terminating phoneme of the second subset at position j, then the i×j element is the minimum value of the three locations plus a cost; and
            wherein the score is a final row and final column element of the matrix.

12. The computer-implemented method of claim 11, comprising:
    receiving real-time interactions;
    filtering a predetermined period of the real-time interaction, generating a buffered audio signal;

extracting a phoneme sequence of the buffered audio signal;

calculating a score between the phoneme sequence of the buffered audio signal and the matched phoneme sequence; and if the score is above a threshold, triggering an alert.

13. The computer-implemented method of claim 11, wherein for each pair of voiceprints, a voice activity detector (VAD) is applied to filter speech from non-speech.

14. The computer-implemented method of claim 11, wherein the threshold may be set per phoneme sequence based on a context of the phoneme sequence.

* * * * *